United States Patent
Takase et al.

(10) Patent No.: US 8,169,895 B2
(45) Date of Patent: May 1, 2012

(54) NETWORK SYSTEM AND NODE

(75) Inventors: Masayuki Takase, Kokubunji (JP);
Kenichi Sakamoto, Kokubunji (JP);
Masahiko Mizutani, Kokubunji (JP);
Hideki Endo, Hachioji (JP); Yoshihiro Ashi, Yokohama (JP); Takayuki Kanno, Yokohama (JP); Nobuyuki Yamamoto, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 449 days.

(21) Appl. No.: 11/703,769

(22) Filed: Feb. 8, 2007

(65) Prior Publication Data
US 2007/0242604 A1    Oct. 18, 2007

(30) Foreign Application Priority Data
Apr. 12, 2006  (JP) ................... 2006-109322

(51) Int. Cl.
*G06F 11/07*    (2006.01)
(52) U.S. Cl. ................... 370/222; 370/217
(58) Field of Classification Search ........... 370/257, 370/217, 452, 219, 222; 709/242
See application file for complete search history.

(56) References Cited

U.S. PATENT DOCUMENTS

| | | | | |
|---|---|---|---|---|
| 5,528,594 A | * | 6/1996 | Butter et al. | 370/452 |
| 7,054,951 B1 | * | 5/2006 | Kao et al. | 709/242 |
| 7,289,433 B1 | * | 10/2007 | Chmara et al. | 370/219 |
| 7,545,735 B1 | * | 6/2009 | Shabtay et al. | 370/217 |
| 2003/0067871 A1 | | 4/2003 | Busi et al. | |
| 2008/0304407 A1 | * | 12/2008 | Umansky et al. | 370/222 |

FOREIGN PATENT DOCUMENTS

| | | |
|---|---|---|
| CN | 1723659 A | 12/2003 |
| WO | WO 2004/056049 A1 | 7/2004 |

OTHER PUBLICATIONS

"Mechanisms to Provide OAM Flows", Recommendation 1.610 (Feb. 2009), pp. 12-48.
"Trail Termination Source Identifier", ITU-T Rec. Y.1711 (Feb. 2004), pp. 4-15.
"RPR Access Method and Physical Layer Specfications", Local and Metropolitan Area Networks (2004) IEEE, pp. 27-54.
An Office Action from Chinese Patent Office dated Aug. 1, 2008 regarding Chinese Patent Application No. 2007100059043, in Chinese.

* cited by examiner

*Primary Examiner* — Kwang B Yao
*Assistant Examiner* — Syed M Bokhari
(74) *Attorney, Agent, or Firm* — Crowell & Moring LLP

(57) ABSTRACT

The invention realizes defect indication on a multipoint logical path and switching of the logical path using a transfer protocol of configuring a logical path in a ring network. A working path and a backup path are set up where each transmits a frame from a transmitting end node to multicast receiving end nodes, forwards the frame to the transmitting end node and terminates it at the transmitting end node after going around the ring. Any node detecting a defect transmits a forward defect indication frame to a multipoint logical path in which the defect occurs. The transmitting end node receiving the forward defect indication frame halts the use of the notified multipoint logical path, and transmits a frame in another path where the forward defect indication frame is not received. When received from both multipoint logical paths, the transmitting end node copies the frame and forwards them to both paths.

10 Claims, 27 Drawing Sheets

NETWORK SYSTEM AND NODE

CLAIM OF PRIORITY

The present application claims priority from Japanese application JP 2006-109322 filed on Apr. 12, 2006, the content of which is hereby incorporated by reference into this application.

BACKGROUND OF THE INVENTION

The present invention relates to a node, and specifically to a method for notifying a defect on a multipoint logical path and switching a logical path in a transfer protocol that constructs a logical path, which is typified by MPLS etc., among plural nodes being connected to a ring network, and a node having such functions.

In response to wider bands of access networks in recent years, a service of distributing broadcast services, as that of mass media such as current television broadcasting, to users in a multicast scheme has begun to be offered. In such broadcast distribution services, a form in which distribution equipment installed in a WAN (Wide Area Network) side to the users distributes a data stream aimed at the users can be postulated. In the broadcast services and the like, service interruption caused by a defect in a transmission path is not allowed. Therefore, in the WAN, means for detecting a defect in the multipoint logical path that connects one transmitting end point with plural receiving end point and means for switching a path become essential. The ring network employs a network topology frequently used for facilities of the WAN (Wide Area Network), the MAN (Metro Area Network), etc. from viewpoints of the ease of path management, defect point detection, etc. FIG. 1 is a diagram for illustrating a general ring network. Four nodes, from a node 101-1 to a node 101-4, are connected mutually by two transmission paths. In the ring network, in order to provide services without interruption even in the occurrence of a defect, two routes of a working ring 102 and a backup ring 103 are provided. In the WAN, the MAN, etc. provided by ISP's and carriers, since high reliability is required, maintenance/management functions, such as monitoring a state of the transmission path, detecting a defection state immediately, and bypassing the defect point, are mandatory.

Therefore, a method for detecting a defect and notifying it is specified in "point-to-point ATM logical path" by ITU-T Recommendation I.610, "B ISDN operation and maintenance principles and functions" (nonpatent document 1) and in "point-to-point MPLS logical path" by ITU-T Recommendation Y.1711, "Requirements for Operation & Maintenance functionality for MPLS networks" (nonpatent document 2), respectively. In the nonpatent document 1 and the nonpatent document 2, continuity of the logical path is checked using a healthcheck frame of a path. Moreover, when a defect is detected on the logical path, the defect is notified to a data receiving end node by a forward defect indication frame. On the other hand, the data receiving end node notifies the defect to a data transmitting end node by a backward defect indication frame. In this occasion, since upward/downward bi-directional logical paths are constructed in the case of the point-to-point logical path, the forward defect indication frame is forwarded to the receiving end node using a path in which the defect occurs, whereas the backward defect indication frame is forwarded to the transmitting end node using a counter path. Hereinafter, the healthcheck frame, the forward defect indication frame, and the backward defect indication frame are generically designated as OAM (Operation, administration and maintenance) frames.

In addition, for example, IEEE802.17 (RPR: Resilient Packet Ring) (nonpatent document 3) specifies means for bypassing a defect point in the occurrence of a defect. The nonpatent document 3 describes a procedure of, when a defect is detected in a physical layer, performing the defect point bypassing as follows.
1. A defect detection position is forwarded to nodes that constitute the ring.
2. When defect information is received, each node calculates a route again.
3. A route that does not pass the defect occurrence point is configured.

SUMMARY OF THE INVENTION

However, although the defect detection method and the defect indication method in the point-to-point logical path are prescribed by the nonpatent document 1 and the by the nonpatent document 2, a method for notifying a defect in a multipoint logical path is not prescribed. Furthermore, since the multipoint logical path is a path for one-way communication, a defect can be notified to a receiving end node by the forward defect indication frame, but the defect cannot be notified to a transmitting end node. In order to notify the defect to the transmitting end node by the conventional means, it is necessary to establish a logical path for defect indication between all the receiving end nodes and the transmitting end node. Because of this, the conventional means was unable to detect and notify a defect in the multipoint logical path.

The nonpatent document 3 targeting Ethernet (registered trade name) that lacks a concept of "path" describes means for bypassing a defect point in the occurrence of a physical layer defect in a ring network. Since Ethernet (registered trade name) has no concept of the logical path, a logical path defect that occurs by erroneous setting of a route table caused by a human error etc. (which means a defect that a node becomes unable to perform communication of data between arbitrary destinations although there is no defect in the physical layer) does not become an object of switching. Therefore, Ethernet is not suitable for a connection-oriented network for providing high-reliability communication in which connectivity in each logical path is checked. Moreover, the nonpatent document 3 does not disclose protection means for protecting multicast data in the occurrence of a defect.

The first object of this invention is to realize specification of a defect point for an individual end-to-endpoint path by managing the multipoint logical path in the form of an endpoint to multi-endpoints.

The second object is to realize a protection function of continuously offering multicast data distribution at the time of detection of a physical layer defect and a logical path defect in a ring network.

In order to attain the first object, in this invention, only a multipoint logic path has: (1) means for terminating a frame transmitted from a transmitting end node at the identical transmitting node after making the frame go around the ring as well as transmitting the frame to multicast-frame receiving end nodes; (2) means for transmitting a healthcheck frame of an endpoint-to-endpoint logical path periodically to the multipoint logical path; and (3) means for, at the time of detection of a defect at an interface that constitutes the ring, transmitting a forward defect indication frame to the multipoint logical path and notifying the transmitting end node and the receiving end nodes of occurrence of the defect.

In order to attain the second object, this invention has, for each multicast flow in which a multicast frame is transmitted on a ring network:
(1) the multipoint logical path serving as a working path that is used when the ring network is normal; (2) means for setting up the multipoint logical path serving as a backup path that is used when the ring network is abnormal between the transmitting end node and the receiving end nodes; (3) means for performing defect indication for each unit of a logical path irrespective of defect kinds, such as a physical layer defect and a logical path defect; (4) means for detecting a defect for each logical path by receiving a forward defect indication frame or detecting not reception of the path healthcheck frame transmitted from the local node itself within a fixed time period in the transmitting end node; (5) means for determining whether logical path defect(s) occurs in the working path, in the backup path, or in the both paths; and (6) means that, if the defect is occurring only in the working path, switches the multipoint logical path from the working path to the backup path; if the defect is occurring only in the backup path, does not switch the logical path and forwards the multicast frame as it is because there is no abnormality in the working path; and if the defects are occurring both in the working path and in the backup path, copies the data in the transmitting end node and transmits the multicast data both to the working path and to the backup path.

According to the node of this invention that is characterized by attaining the first object, since the multipoint logical path is constructed so as to go around the ring, from a transmitting end node to the transmitting end node, even in the case of multicast communication that is basically only a one-way communication, a route of transferring defect information to the transmitting end can be secured. Moreover, since the healthcheck frame is transmitted via the multipoint logical path, each receiving end node can check the health of the path. Furthermore, the transmitting end node can check the health of the logical path in the ring by receiving the healthcheck frame transmitted by the local node itself. Still moreover, if a defect occurs, defect information in the passing route and at the receiving end node can be notified to the transmitting end node by forwarding the forward defect indication frame via the multipoint logical path without setting a logical path for defect indication etc.

Still moreover, according to the node of this invention that is characterized by attaining the second object, since the logical path is switched depending on a defect point and a frame is copied and forwarded to the multipoint transfer path, the multicast distribution can continue to be provided.

DESCRIPTION OF THE PREFERRED EMBODIMENTS

With reference to the attached drawings, preferred embodiments of a ring network, a node constituting the ring network, and a method for detecting a defect, notifying the defect, and switching paths according to this invention will be described in detail. Hereafter, in the embodiments, this invention will be described taking MPLS as an example. However, this invention can be applied to all protocols by each of which a logical path is constructed and a frame is forwarded therein.

Figure 10:
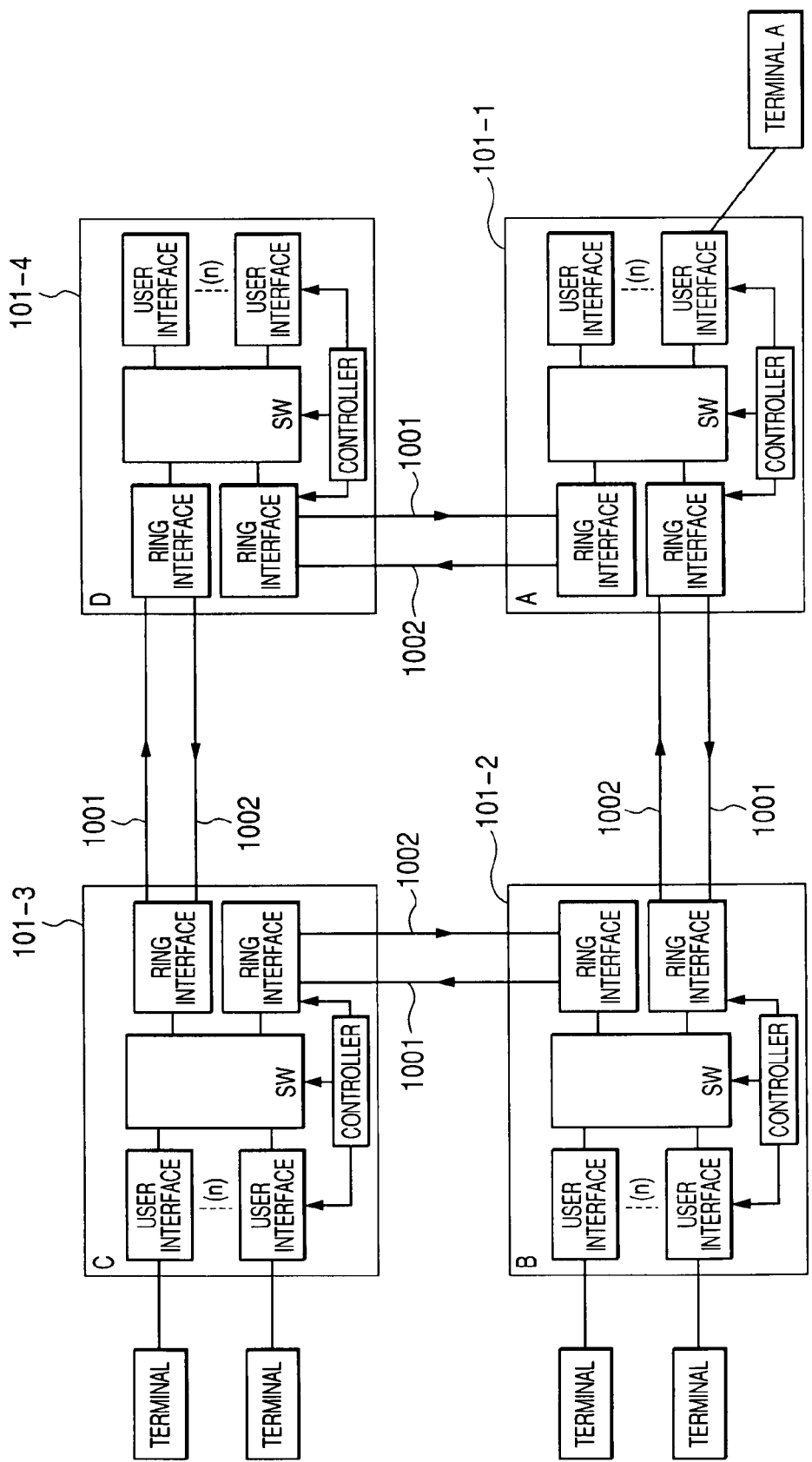
FIG. 10 is a diagram showing a ring network constructed with the nodes of this invention.

FIG. 10 is a diagram for explaining a network configuration and means for forwarding a multicast frame using the network to which this invention is applied. In this configuration example, four nodes 101-1 to -4 constitute a ring network. The number of the nodes constituting the ring network can be increased or decreased irrespective of these embodiments. Respective groups of the nodes constituting the ring networks are connected with two paths. Each path is given a predetermined direction of frame forwarding. Here, as an example of explanation, a transmission path of a direction of the left-handed rotation is designated as a transmission path A 1001; a transmission path of a direction of the right-handed rotation is designated as a transmission path B 1002. In this ring network, plural point-to-point logical paths or point-to-multi-point logical paths are formed for each of plural MPLS labels.

Figure 1:
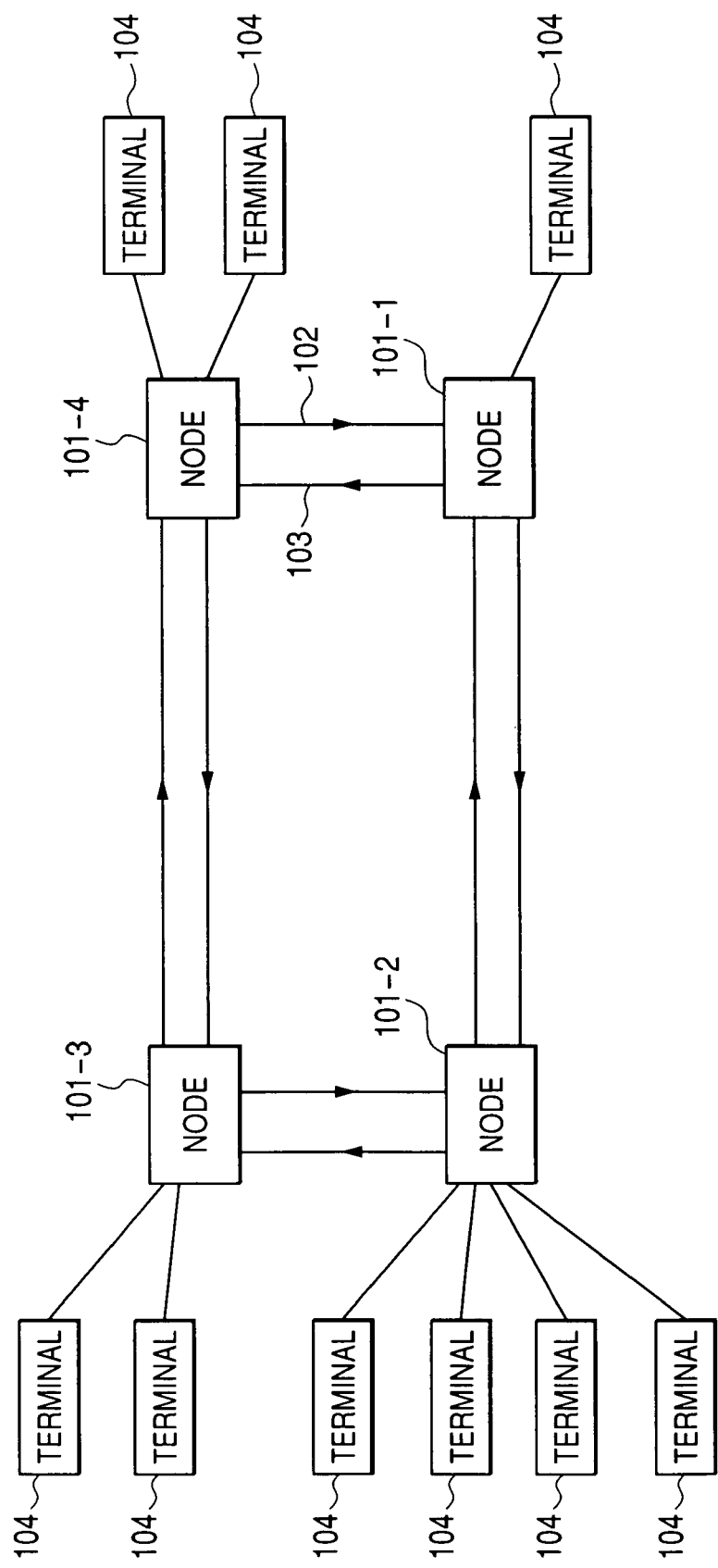
FIG. 1 is a diagram showing a general ring network topology.
Figure 2:
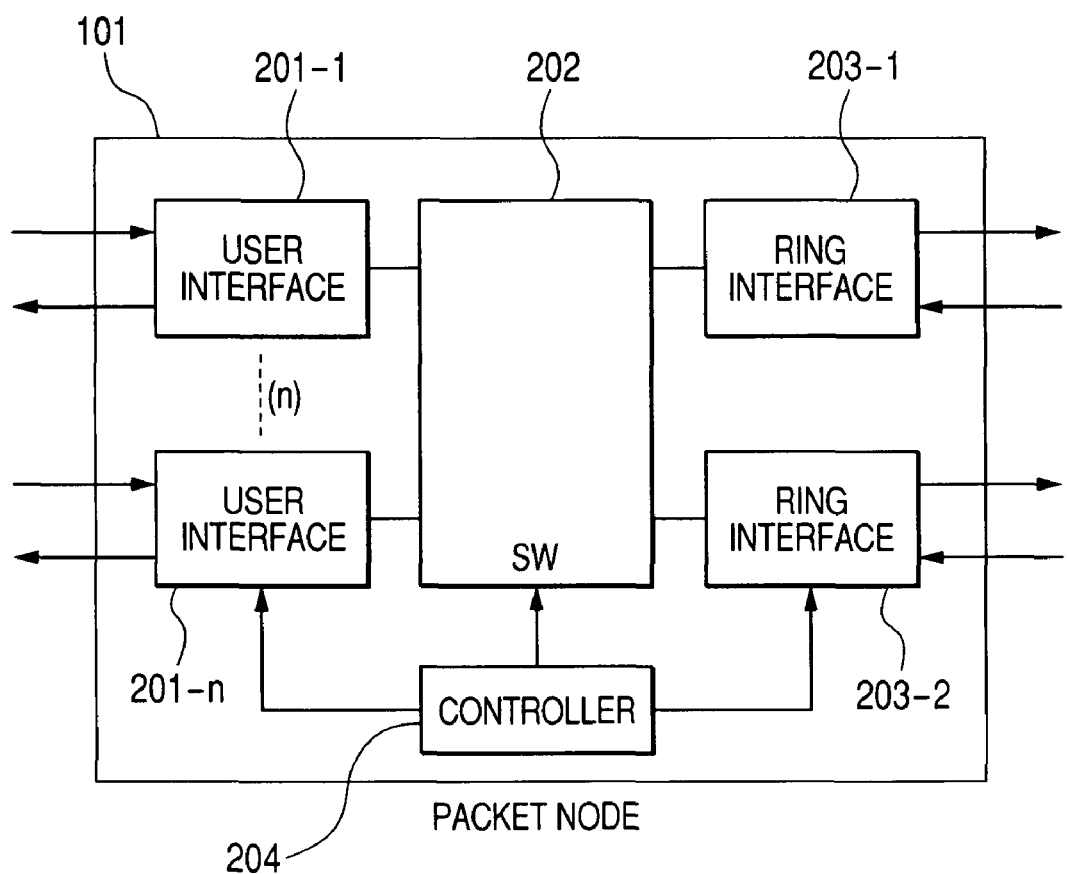
FIG. 2 is a diagram showing a node of this invention.

FIG. 2 is a diagram showing a structure of the node 101 constituting the ring network. The node 101 consists of n boards of user interfaces 201-1 to -n, a switch 2002, two boards of ring interfaces (hereinafter each referred to as a ring interface) 203-1 and -2, and a controller 204.

The user interface 201 is an interface for directly connecting with a user terminal or connecting with another router, an Ethernet (registered trade name) switch, a G-PON (Gigabit Passive Optical Network), or the like. A frame inputted into the user interface 201 from the outside of the node is assigned the MPLS label from header information and an internal header and is forwarded to a switch 202. Moreover, the frame inputted into the user interface 201 from the switch 202 is stripped of its internal header and MPLS label and is forwarded to the outside of the node.

The switch 202 switches a frame based on the internal header information of the frame inputted from the user interface 201 or the ring interface 203. Moreover, the multicast frame is replicated and distributed to a predetermined interface based on the internal header information.

The ring interface 203 is an interface for connecting adjacent nodes 101 therewith. A destination of the frame inputted into the ring interface 203 from the outside of the node is determined based on the MPLS header information. The frame is given the internal header and is forwarded to the switch 202. A frame inputted into the ring interface 203 from the switch 202 is stripped of the internal header and is forwarded to an adjacent node.

The controller 204 updates pieces of table information that are retained by the user interface 201, the switch 202, and the ring interface 203. Moreover, the controller 204 collects defect information notified from each user interface and each ring interface, and notifies it to an administrator.

Figure 11:
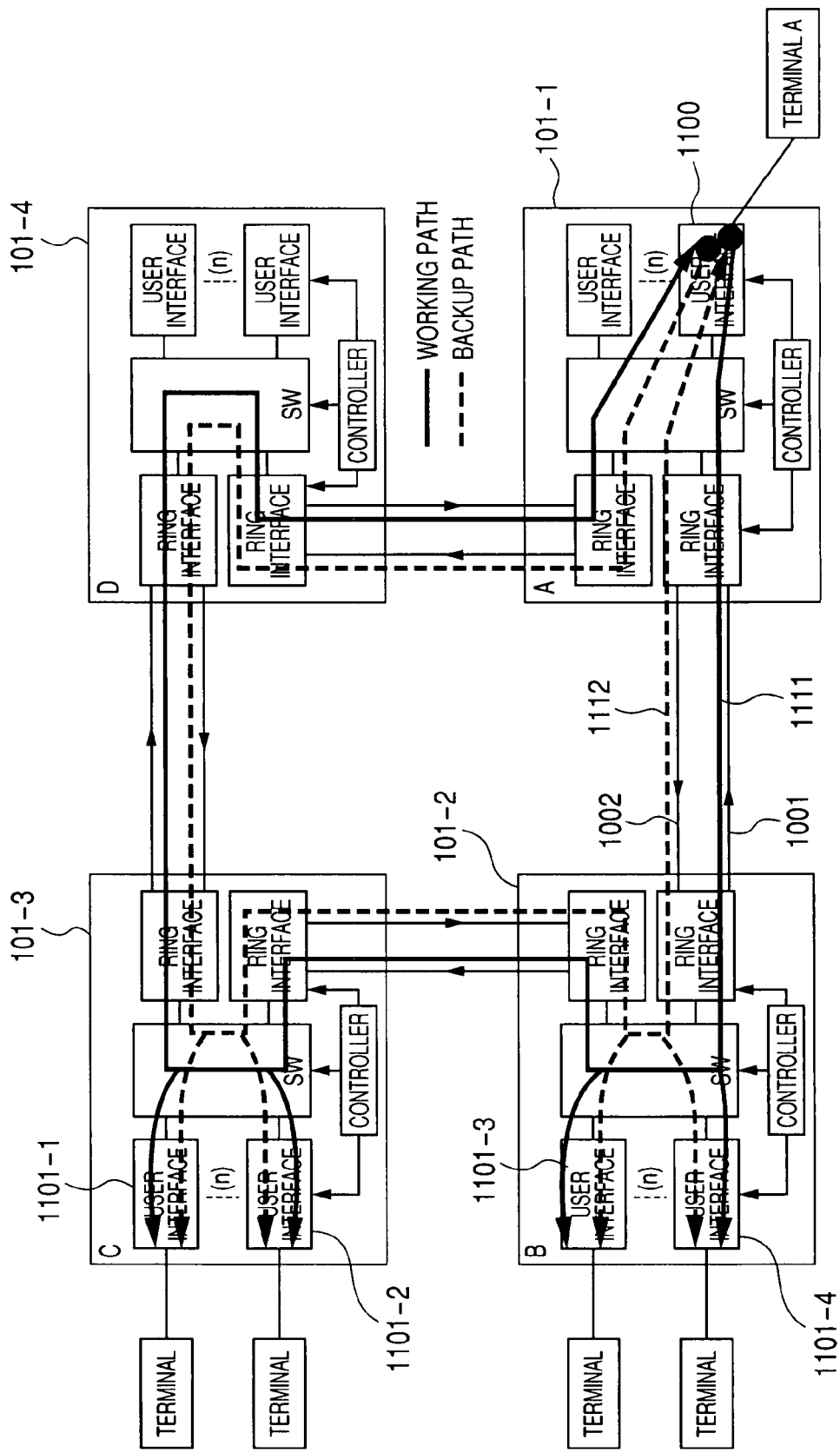
FIG. 11 is a diagram showing a multipoint logical path configured on the ring network constructed with the nodes of this invention.

FIG. 11 shows an example of the case where a multipoint logical path is set up in the ring. This multipoint logical path serves a user interface 1100 of the node 1011 as a transmitting end, and serves user interfaces 1101-3, 1101-4 of the node 101-2 and user interfaces 1101-1, 1101-2 of the node 101-3 as receiving ends. In FIG. 11, a working path 1111 is set on a transmission path A 1001, and a backup path 1112 is set on the transmission path B 1002. Thus, by setting the working path and the backup path on different transmission paths, when one defect occurs, the path is switched from the working path to the backup path, whereby it becomes possible to provide multicast transfer without interruption. Moreover, as shown in FIG. 11, the multipoint logical path is set so as to go around the ring and be terminated by the user interface of the multicast transmitting end node. Since by this setting, all the multipoint logical paths pass through all the nodes that constitute the ring network, it is necessary to manage passing through nodes for each multipoint logical path. Although FIG. 11 illustrates only one multipoint logical path that serves the user interface 1100 as the transmitting end, actually plural multipoint logical points each of which serves a different user interface as the transmitting end are set on this ring network. By applying the technology disclosed by this invention to all of these multipoint logical paths, detection of a defect and path switching in the occurrence of the defect become possible.

First, a detailed block diagram of the user interface 201 and the ring interface 203 and their operations will be explained, giving a detailed description of a processing procedure from data frame reception until transmission and a transmission procedure of an OAM frame. Means for detecting and notifying a defect at each location in the occurrence of a defect and means for switching paths will be described in detailed.

Figure 3:
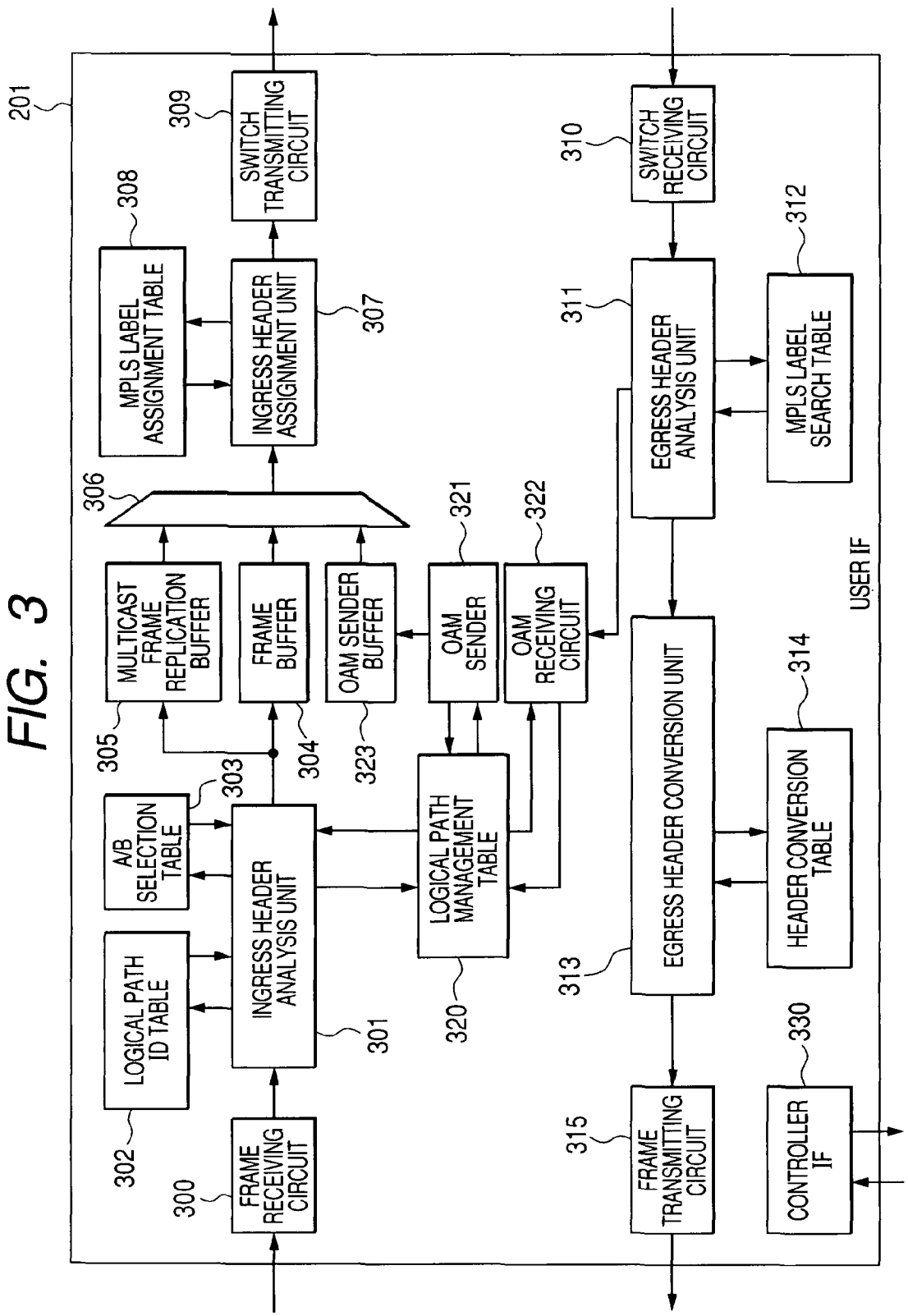
FIG. 3 is a diagram showing a user interface of the node of this invention.

FIG. 3 is a detailed block diagram of the user interface 201. The user interface 201 consists of the following components: a frame receiving circuit 300; an ingress header analysis unit 301; a logical path ID table 302; an A/B selection table 303; a frame buffer 304; a multicast (hereinafter referred to as MC) frame replication buffer 305; a selector 306; an ingress header assignment unit 307; an MPLS label assignment table 308; a switch transmitting circuit 309; a switch receiving circuit 310; an egress header analysis unit 311; an MPLS label search table 312; an egress header conversion unit 313; a header conversion table 314; a frame transmitting circuit 315; a controller IF 330; a logical path management table 320; an OAM sender 321; an OAM receiver 322; and an OAM sender buffer 323.

Figure 5:
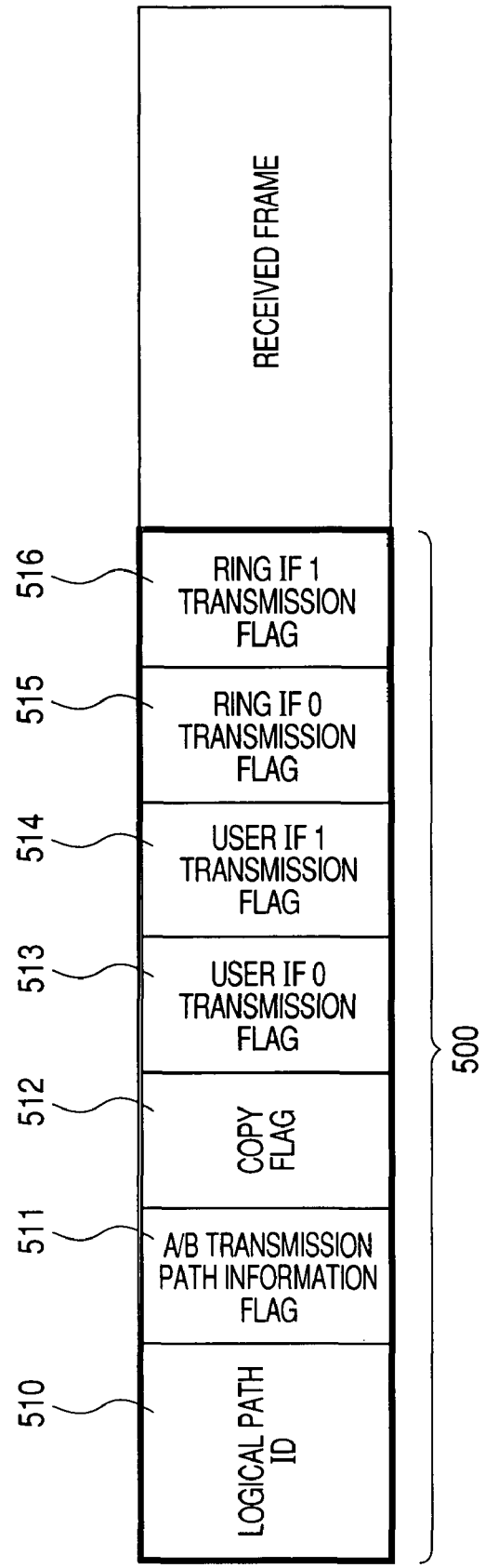
FIG. 5 is a diagram showing a format of an internal header used in the node of this invention.

When a data frame is inputted into this node from a user terminal, first the frame receiving circuit 300 gives it an internal header 500 shown in FIG. 5.

In this node 101, processing results are all stored in the internal header, and each processing block determines processing of the frame by referring to the internal header. The internal header 500 is composed of a logical path ID field 510, an A/B transmission path information field 511, a copy flag field 512, a user IF0 transmission flag field 513, a user IF1 transmission flag field 514, a ring IF0 transmission flag field 515, and a ring IF1 transmission flag field 516. The user interface transmission flag field has a structure that allows addition of the flags up to the number of user interfaces. The frame receiving circuit 300 sets a default value 0 in all the fields of the internal header 500, and forwards the frame to the next block.

The ingress header analysis unit 301 is a block for referring to the logical path ID search table 302, the A/B selection table 303, and the logical path management table 320. When the ingress header analysis unit 301 receives a data frame, it searches the logical path ID table 302 from frame header information, for example, such as of MAC address and VLAN. The logical path ID search table stores a logical path ID to which the input frame belongs.

Figure 6:
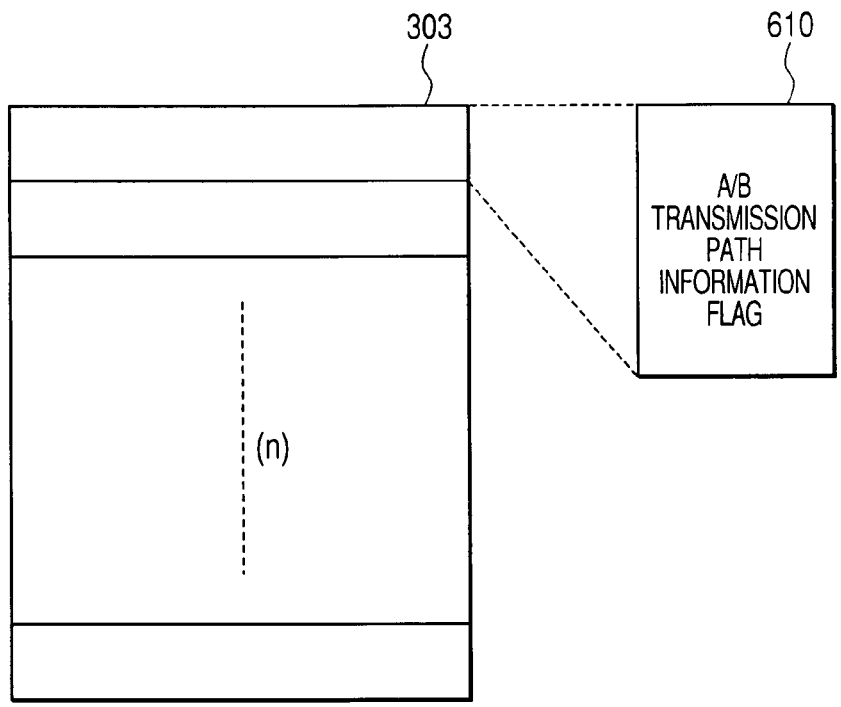
FIG. 6 is a diagram for explaining a format and entries of an A/B selection table.

When the ingress header analysis unit 301 acquires a logical path ID, it writes information of the acquired logical path ID in a logical path ID field 510 of the internal header 500. Next, the ingress header analysis unit 301 searches the A/B selection table 303 using the acquired logical path ID as a table search address. FIG. 6 shows a table format and table entries of the A/B selection table 303. The A/B selection table 303 retains A/B transmission path information 610 indicating which path, the transmission path A or the transmission path B, is in service as the working path for each logical path. That is, a path being set in the A/B selection table 303 is the current working path. The A/B transmission path information 610 is 1-bit information. For example, when its value is "0," it indicates that the transmission path A is in service as a working path; when the value is "1," the transmission path B is in service as the working path. The ingress header analysis unit 301 writes the acquired A/B transmission path information 610 in the A/B transmission path information field 511 of the internal header 500.

Figure 7:
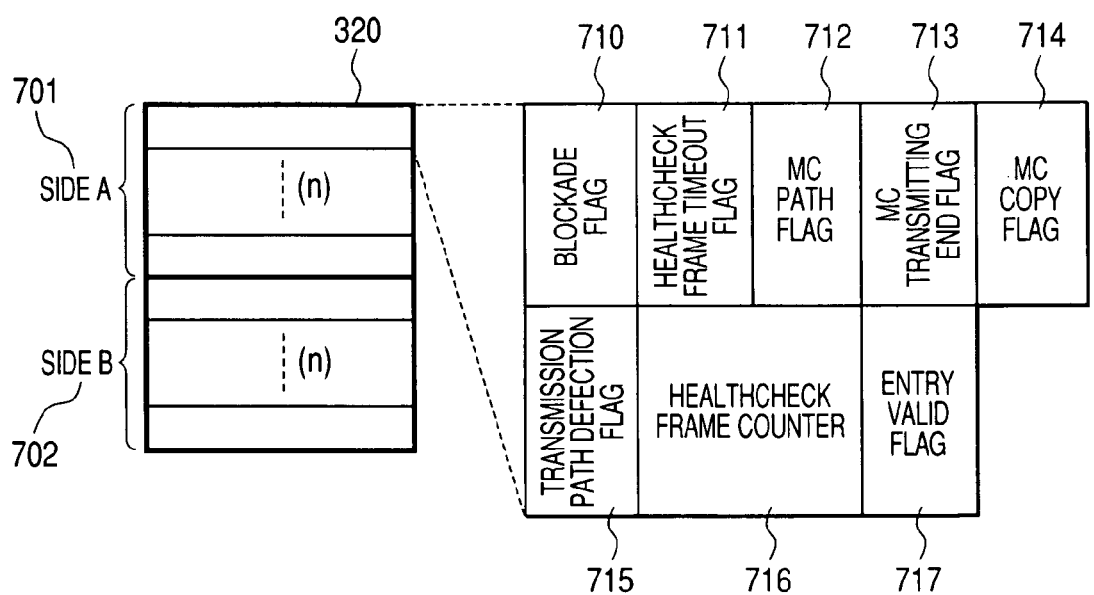
FIG. 7 is a diagram for explaining a format and entries of a logical path management table.

Next, the ingress header analysis unit 301 creates the search address from the logical path ID and the A/B transmission path information 610, and searches the logical path management table 320. The logical path management table 320 is a table for managing an operation status and a state of existence/absence of a defect for each logical path. FIG. 7 shows a table format and table entries of the logical path management table 320. The table search addresses of the logical path management table 320 are each created from the transmission path information 610 and the logical path ID. The transmission path information 610 is used as the most significant 1 bit of the table search address, and the logical path ID is used as a low-order bit. Therefore, among entries of the logical path management-table 320, any table entry whose address 800 has a high-order 1 bit of "0" is an entry (side A 701) for the transmission path A, and any table entry whose address has a high-order 1 bit of "1" is an entry (side B 702) for the transmission path B. An address system of the search address in the table and an address of each entry, which is the same as an MPLS label assigning table that will be described later, is such that, when information of one logical path is set up in the table, for example, the working path information is registered in the side A and the backup path information is registered in the side B, and accordingly the two paths, the working and backup paths, can be managed. Entries of the logical path management table consist of: a blockade flag 710 indicating availability/unavailability of a current path; a healthcheck frame timeout flag 711 for warning that a healthcheck frame is not received within a fixed time period; an MC (Multi Cast) path flag 712 indicating that the logical path is the multipoint logical path; an MC (Multi Cast) transmitting end flag 713 indicating that this user interface 201 is a transmitting end of the MC (Multi Cast) frame; an MC (Multi Cast) copy flag 714 indicating whether the frame needs to be copied by the user interface 201 and be forwarded; a transmission path defection flag 715 indicating whether a defect is occurring in the transmission path, a healthcheck frame counter 716 for managing whether the healthcheck frame was received successfully within a fixed time period by reducing its value by unity for each predetermined time and by clearing the counter value to an initial setting value (i.e., 3 or else) upon each reception of the healthcheck frame; and an entry valid flag 717 indicating an operation status of this entry. The entry valid flag "1" indicates registration completion of the entry (being under operation), and "0" indicates no registration of the entry (not being under operation).

When the ingress header analysis unit 301 acquires entry information of the logical path management table, it sets entry contents of the MC copy flag 714 in a copy flag field 512. After the completion of the processing, the ingress header analysis unit 301 stores a frame with the copy flag 512 of the internal header 500 of "0" in the frame buffer 304 and stores a frame with the copy flag 512 of "1" in the MC (Multi Cast) frame replication buffer 305.

The frame buffer 304 is a buffer for temporarily storing a frame when the frame is being transmitted from the MC frame replication buffer 305 or the OAM sender buffer 323. When the frame buffer 304 receives the frame transmission signal from the selector 306, it reads one frame from the buffer part.

The MC frame replication buffer 305 is a buffer for temporarily storing a frame with a copy flag 512 of "1" when the frame is being transmitted from the frame buffer 304 or the OAM sender buffer 323. When the MC frame replication buffer 305 receives a frame transmission signal from the selector, it starts frame transmission. When the MC frame replication buffer 305 transmits the frame, it copies the frame so as to have two frames. In doing so, the MC frame replication buffer 305 rewrites a value of the A/B transmission path information field of the header of the second frame to "0" if the original frame inputted from the ingress header analysis unit is "1," and to "1" if the original frame is "1," and transmits it.

The selector 306 carries out scheduling about which buffer from among the frame buffer 304, the MC frame replication buffer 305, and the OAM sender buffer 323 is read for the frame, and transmits a frame transmission enabling signal to any one of the buffers. The any one of the buffers that receives the frame transmission enabling signal reads one frame and forwards it to the ingress header assignment unit 307.

The ingress header assignment unit 307 is a block that creates a search address from the logical path ID 510 of the internal header 500 of the received frame and the A/B transmission path information flag 511, searches the MPLS label assignment table 308, creates the MPLS label based on information of an entry searched from the MPLS label assigning table 308, and gives it to the data frame.

Figure 8:
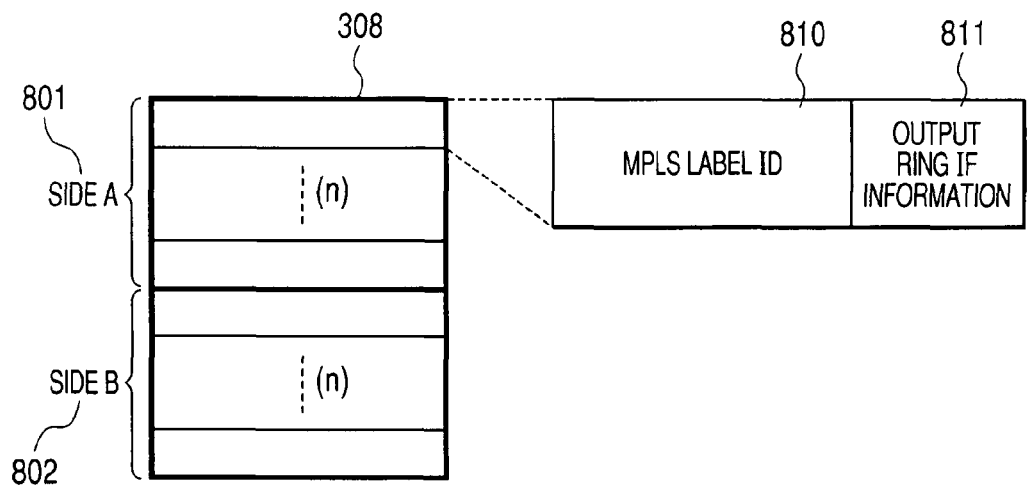
FIG. 8 is a diagram for explaining a format and entries of an MPLS label assigning table.

FIG. 8 shows a table format and table entries of the MPLS label assignment table 308. The table search address of the MPLS label assignment table 308 is created from the transmission path information 610 and the logical path ID. The transmission path information 610 is used as the most significant 1 bit of the table search address, and the logical path ID is used as the low-order bit. Therefore, any table entry whose address 800 has a high-order 1 bit of "0" becomes an entry for the transmission path A (the side A801), and any table entry whose address has a high-order 1 bit of "1" becomes an entry for the transmission path B (the side B 802). Each entry of the MPLS label assignment table 308 is composed of an MPLS label ID 810 that corresponds to the logical path ID and output ring interface information 811 indicating to which ring interface the frame is to be forwarded.

The ingress header assignment unit 307 creates an MPLS tag from the MPLS label ID obtained from a search result of the MPLS label assignment table 308, and assigns the MPLS tag to the received frame. Moreover, when the output ring ID information 811 is "0," "1" is set in the ring IF0 transmission flag field 515 of the internal header 500; when it is "1," "1" is set in the ring IF1 transmission flag field 516 of the internal header 500. After the processing is completed, the ingress header assignment unit 307 forwards the frame to the switch transmitting circuit 309.

The switch transmitting circuit 309 is a circuit for forwarding a received frame to the switch 202. The above is the flow from inputting of a data frame into the user interface until forwarding of the data frame to the switch. Next, a flow from inputting of the data frame into the user interface from the switch until forwarding of the data frame to the outside of the node will be explained.

The switch receiving circuit 310 is a circuit that, when receiving a data frame from the switch 202, forwards the frame to the egress header analysis unit 311. The egress header analysis unit 311 performs checking of periodical reception of the healthcheck frame and specification of a defect position from the forward defect indication frame, and specific logical path switching processing based on the path switching request frame.

Figure 31:
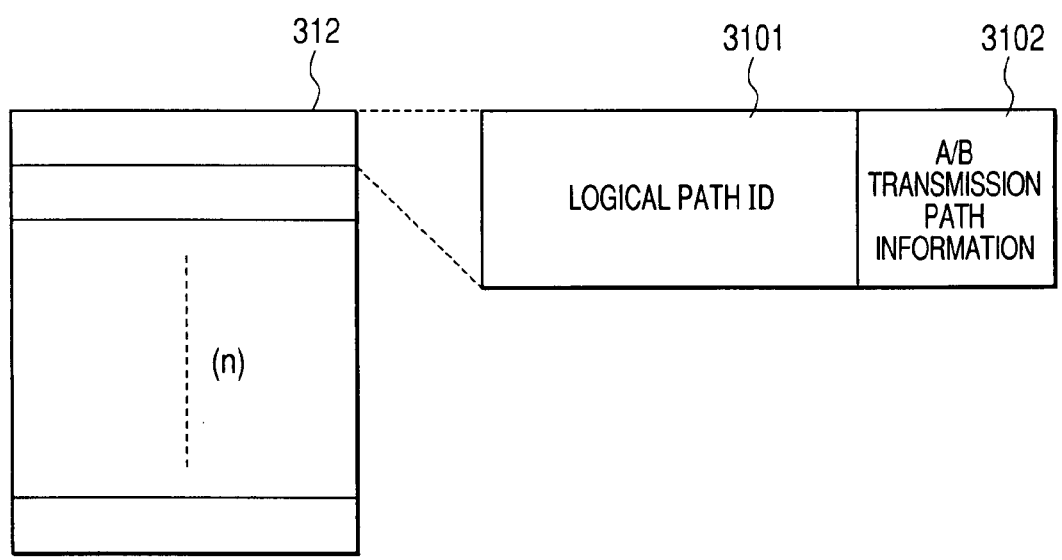
FIG. 31 is a diagram for explaining a format of the MPLS label assigning table and its entries.

A processing procedure when the egress header analysis unit 311 receives a frame will be illustrated below. First, the egress header analysis unit 311 extracts the MPLS label ID of the received frame and discriminates whether the received frame is a data frame or an OAM frame (since the OAM frame is given a label ID to identify the OAM frame itself in addition to the normal MPLS label, it can be discriminated). After the discrimination of the received frame, the egress header analysis unit 311 acquires a table entry from the user interface MPLS label using the MPLS label as a table search address. FIG. 31 shows a table format and table entries of the MPLS label search table 312. The entry of the MPLS label search table 312 contains a logical path ID 3101 to search the logical path management table 320 and the A/B transmission path information 3102. In the case where the received frame is a data frame, when the egress header analysis unit 311 acquires a table entry, it writes a logical path ID and A/B transmission path information in the internal header 500 and forwards the frame to the egress header conversion unit 313. When a received frame is the OAM frame, the frame is forwarded to the OAM receiver 322.

When the output header conversion unit 313 receives a frame, it extracts a logical path ID from its internal header 500 and searches the header conversion table 314. The header conversion table 314 is a table for retaining information of VLAN tag processing (including assignment, conversion, deletion, transmission, etc.) performed on the received frame and the like. The output header conversion unit 313 deletes an MPLS label tag of the received frame based on entry information, performs VLAN tag processing, and forwards the frame to the frame transmitting circuit 315. The frame transmitting circuit 315 deletes the internal header 500, and transmits the frame to the outside of the node. The controller IF 330 is a communication IF between the controller 204 of the packet node 101 and the user interface 201. The controller 204 performs setup of various tables following the controller IF 330. The above is the block configuration of the user interface 201 and the processing procedure of a data frame in the user interface 201.

Figure 4:
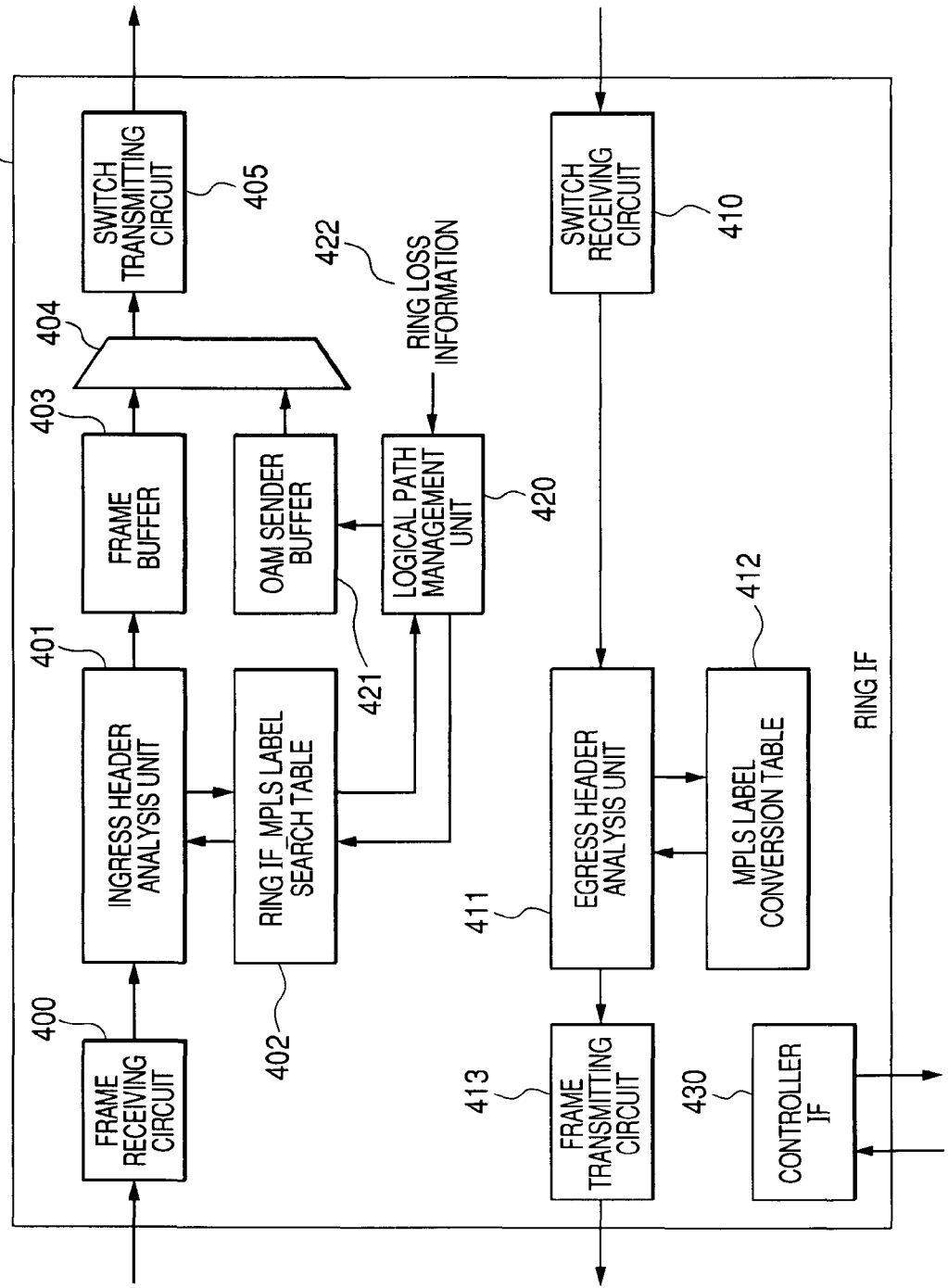
FIG. 4 is a diagram showing a ring interface of the node of this invention.

Next, a block diagram of the ring interface 203 and a processing procedure of a data frame in the ring interface 203 will be explained below. FIG. 4 is a block diagram of the ring interface 203. The ring interface 203 consists of a frame receiving circuit 400, an ingress header analysis unit 401, a ring interface MPLS label search table 402, a frame buffer 403, a selector 404, a switch transmitting circuit 405, a switch receiving circuit 410, an egress header analysis unit 411, an MPLS label conversion table 412, a frame transmitting circuit 413, a logical path management unit 420, an OAM sender buffer 421, and a controller IF 430.

When the frame receiving circuit 400 receives a frame from the outside of the node, it gives thereto the internal header 500 shown in FIG. 5. The internal header 500 given here is the same as the internal header given by the user interface 201. The frame receiving circuit 400 sets default values of zero's in all the fields of the internal header 500, and transmits the frame to the ingress header analysis unit 401. The ring interface 203 performs the same processing irrespective of a kind of a received frame (data frame, OAM frame).

The ingress header analysis unit 401 acquires a table entry from the MPLS label search table 402 using the MPLS label ID of the received frame as a table search address.

Figure 9:
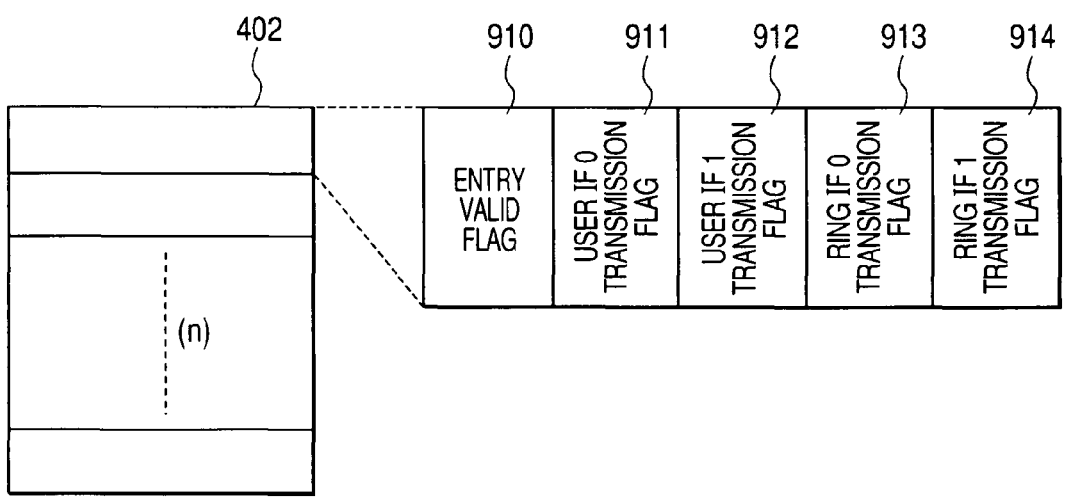
FIG. 9 is a diagram for explaining a format and entries of an MPLS label search table.

FIG. 9 shows a table format and table entries of the MPLS label search table 402. The MPLS label search table 402 has an entry valid flag 910 for indicating whether an entry is valid or invalid and the following flags each for indicating a transmission destination IF of the received frame: a user IF0 transmission flag 911, a user IF1 transmission flag 912, a ring IF0 transmission flag 913, and a ring IF1 transmission flag 914. It becomes possible to relay and terminate the multicast frame by setting to "1" a transmission flag of the user interface that is to receive the multicast frame and by similarly setting to "1" a transmission flag of the ring interface having the next node that is to receive the multicast frame, both of which are entries of this table, respectively, at the multicast receiving end node. Moreover, it becomes possible to terminate the multicast frame at the transmitting end IF by setting to "1" a transmission flag of the user interface that is to serve as a multicast-frame transmitting end of this table at the multicast transmitting end node. Furthermore, regarding this table entry of the node for relaying the multicast frame, it becomes possible to relay the multicast frame by setting to "1" a transmission flag of the ring interface having the next node that is to receive the multicast frame. By setting the table in this way, a configuration of the multipoint logical path going around the ring becomes attainable.

When the ingress header analysis unit 401 acquires an entry of the MPLS label search table, it writes the acquired entry information in the user IF0 transmission flag 513, the user IF1 transmission flag 514, the ring IF0 transmission flag 515, and the ring IF1 transmission flag 516 of the internal header 500, and stores the frame in the frame buffer 403.

The frame buffer 403 is a buffer for temporarily storing a frame when the frame is being transmitted from the OAM sender buffer 421. When the frame buffer 403 receives a frame sending signal from the selector 404, it reads one frame from the buffer. The selector 404 makes scheduling as to from which buffer, the frame buffer 403 or the OAM sender buffer 421, the frame is to be read, and transmits the frame sending signal to the buffer. The switch transmitting circuit 405 is a circuit for forwarding a received frame to the switch 202.

The above is a flow from inputting of a frame into the ring interface 203 until forwarding of the frame to the switch 202. Next, a flow from inputting of a frame into the ring interface 203 from the switch 202 and until forwarding of the frame to the outside of the node will be described. The switch receiving circuit 410 is a circuit for, when receiving a frame from the switch 202, forwarding the frame to the egress header analysis unit 411. The egress header analysis unit 411 is a block that searches the MPLS label conversion table 412 using the MPLS label ID as a search key, and performs conversion processing on the MPLS label according to table information.

The frame transmitting circuit 413 deletes the internal header 500, and transmits the frame to the outside of the node. The control unit IF 430 is a communication IF between the controller 204 of the packet node 101 and the ring interface 203. The controller 204 performs setup of various tables through its control unit IF 430. The above is a block configuration of the ring interface 203 and a processing procedure of a data frame in the ring interface 203.

Next, processing of the OAM frame will be explained. In this invention, at least one of the healthcheck frame, the backward defect indication frame, and the forward defect indication frame is used in order to check continuity of the multipoint logical path, notify a defect in the multipoint logical path, and switch a path of the multipoint logical path.

Figure 29:
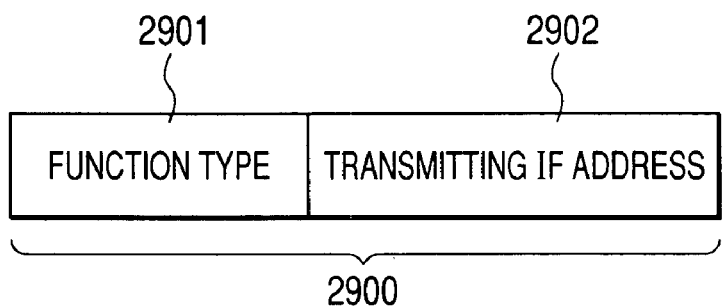
FIG. 29 is a diagram showing a format of a path healthcheck frame.

First, continuity check of the multipoint logical path and a defect indication will be explained. The healthcheck frame is used for continuity check of the multipoint logical path. FIG. 29 shows a frame format of the healthcheck frame. A healthcheck frame 2900 is composed of a function 2901 of identifying this frame as the healthcheck frame and a transmission IF address field 2902 for storing the transmission IF address of the healthcheck frame. This frame is given the MPLS label tag having a path label ID that is allocated to each logical path and the MPLS label tag having a label ID for identifying this frame as a frame of an administrative system. The OAM sender 321 of the user interface 201 of a multicast-frame transmitting end node periodically transmits the healthcheck frame 2900 to the multipoint logical paths of the working path and the backup path, respectively. The healthcheck frame 2900 goes around the user interface of the multicast frame for each multipoint logical path and the ring and is terminated by the user interface of the transmitting end node. When the OAM receiver 322 of the user interface at each terminating position receives the healthcheck frame 2900, it searches the logical path management table 320 from the MPLS label ID, and clears a value of the healthcheck frame counter 716 in the entry, giving an initial setting value (i.e., 3). Since the healthcheck frame counter 716 value is periodically reduced by unity in a processing flow of the OAM sender 321 that will be described later, if the healthcheck frame 2900 cannot be received for a fixed period, the value becomes zero, whereby the OAM receiver 322 can recognize that a defect is occurring in the logical path. Each user interface of the multicast-frame receiving end can verify that the logical path has continuity normally by receiving this frame periodically, as described above. Moreover, the transmitting end node user interface can also verify that the ring network has continuity normally by receiving the healthcheck frame 2900 transmitted by the local node itself.

Figure 32:
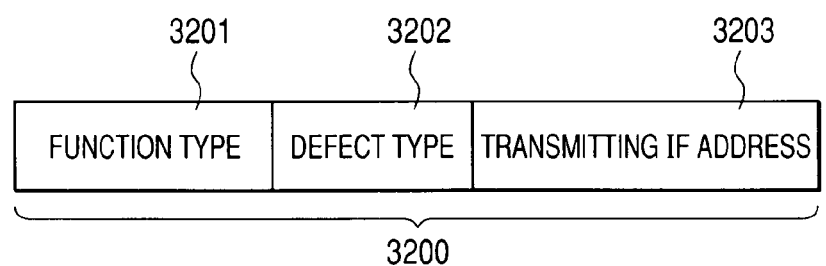
FIG. 32 is a diagram showing a format of a backward defect indication frame.

When the multicast-frame receiving end node becomes unable to receive the healthcheck frame 2900, the OAM sender 321 forwards a backward defect indication frame 3200 to the transmitting end node user interface using the multipoint logical path. FIG. 32 shows a frame format of the backward defect indication frame. The backward defect indication frame 3200 is composed of fields of a function flag 3201 for identifying this frame as the backward defect indication frame, a defect type 3202 for notifying a kind of the defect, and a transmission IF address 3203 for specifying a point of occurrence of the defect. By receiving this backward defect indication frame, the transmitting end node can recognize on which user interface the defect is occurring.

Since transmission of the multicast frame is basically for a one-way direction, the conventional network and the conventional node were not able to notify a defect in the multipoint logical path to the transmitting end node. Alternatively, it was necessary to set a point-to-point path for defect indication between the multicast-frame receiving end node user interface and the transmitting end node user interface although transmission of a data frame is not performed. However, in this invention, since the multipoint logical path is formed so as to go around the ring, defect information can be forwarded to the transmitting end node using the multipoint logical path.

Figure 28:
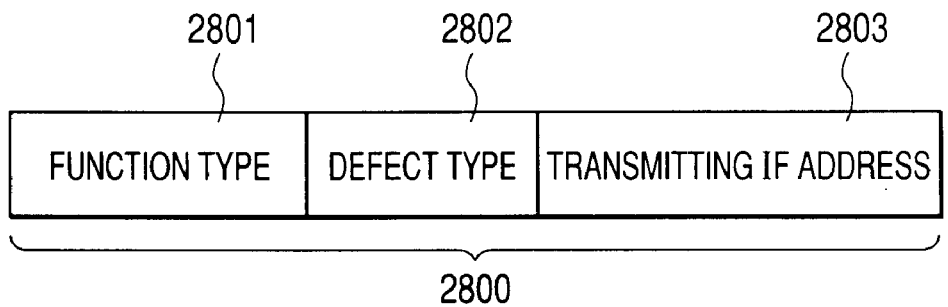
FIG. 28 is a diagram showing a format of a forward defect indication frame.

In the above, detection of a defect in an individual logical path was described. Next, detection when a physical defect occurs in the transmission path will be described. Mainly a defect of the transmission path occurs by a failure of the ring interface, or break of optical fiber, or the like. When one of these defects occurs, the ring interface opposed to this becomes unable to receive optical signals, and accordingly Loss information is transmitted from an optical module (not illustrated) of the ring interface. The logical path management unit 420 that receives this information reads the MPLS label search table from its top sequentially, recognizes a valid entry flag 910, creates a forward defect indication frame 2800 for the valid entry, and transmits it. FIG. 28 shows a frame format of the forward defect indication frame. At this time, an ID indicating occurrence of Loss is set in a defect type 2802, and an address of the ring interface that detects Loss is set in a transmission IF address 2803. Moreover, the forward defect indication frame 2800 is assigned a label expressing the OAM frame, the MPLS label specifying a logical path (the label ID being capable of being acquired from an address of the table entry), and the internal header 500 (for a field value of the internal header, information obtained from the table entry being set), and is stored in the OAM sender buffer 421. By performing the above-mentioned processing on all the entries, transmission path defect information can be notified to all of the working paths and the backup paths.

In nonpatent documents 1 and 2 that belong to the conventional technology, the receiving end node user interface that receives the forward defect indication frame 2800 notifies occurrence of a defect in the transmission path to the transmitting end node user interface using the backward defect indication frame 3200. However, since the multipoint logical path of this invention goes around the ring and the frame is terminated also at the transmitting end node user interface, it is unnecessary for the receiving end node user interface to transmit the backward defect indication frame 3200 when receiving the forward defect indication frame 2800 in the multipoint logical path. It is desirable to do this, because the need of receiving a large amount of backward defect indication frames is eliminated, producing an effect of reducing a processing load. Moreover, by not using the backward defect indication frame 3200, an effect of controlling band consumption of a ring network can also be acquired.

Next, termination processing of the forward defect indication frame 2800 will be explained. The forward defect indication frame 2800 is terminated by the OAM receiver 322 of the user interface 201. When the OAM receiver 322 receives the forward defect indication frame 2800, it checks its defect type 2802 and transmission IF address 2803. When the defect type 2802 is one that notifies the occurrence of Loss and the transmission IF address is one that is of the ring interface, there is the possibility that a defect occurs in a part of a route constituting the ring, and the frame is not transmitted to all of the user interfaces that are to receive the multicast frame.

Therefore, when the OAM receiver 322 receives the frame, it searches the logical path management table 320 from the MPLS label ID, and sets "1" that indicates occurrence of a defect in the transmission path defection flag 715 in the entry. Moreover, the OAM receiver 322 notifies the controller of the frame information of a defection frame (defect type and transmission IF address). When the OAM receiver 322 receives either the forward defect indication frame or the backward defect indication frame other than the above, there does not occur a defect in the route constituting the ring; therefore, it does not set the transmission path defection flag 715 and notifies the controller 204 only of frame information of the defect frame.

Performing the above processing can realize check of continuity of the multipoint logical path, and indication and specification of a defect point both in the multicast receiving end node and in the multicast transmitting end node in the occurrence of the defect.

Figure 30:
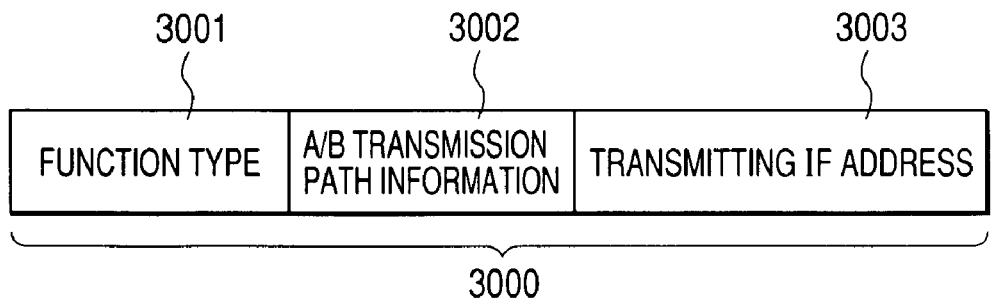
FIG. 30 is a diagram showing a format of the path switching request frame.

Next, switching processing of the multipoint logical paths at the time of defect detection will be explained. For switching of multipoint logical paths, a path switching request frame 3000 shown in FIG. 30 is used. The path switching request frame 3000 consists of a function 3001 of identifying this frame as a path switching request frame, A/B transmission path information 3002 for notifying a transmission path to be used after the switching, and a transmission ID address 3003 for storing an address of the user interface having transmitted the path switching request frame.

Transmitting processing of the path switching request frame 3000 is done by the OAM sender 321. Termination of the path switching request frame 3000 and path switching processing are performed in the OAM receiver 322.

Figure 20:
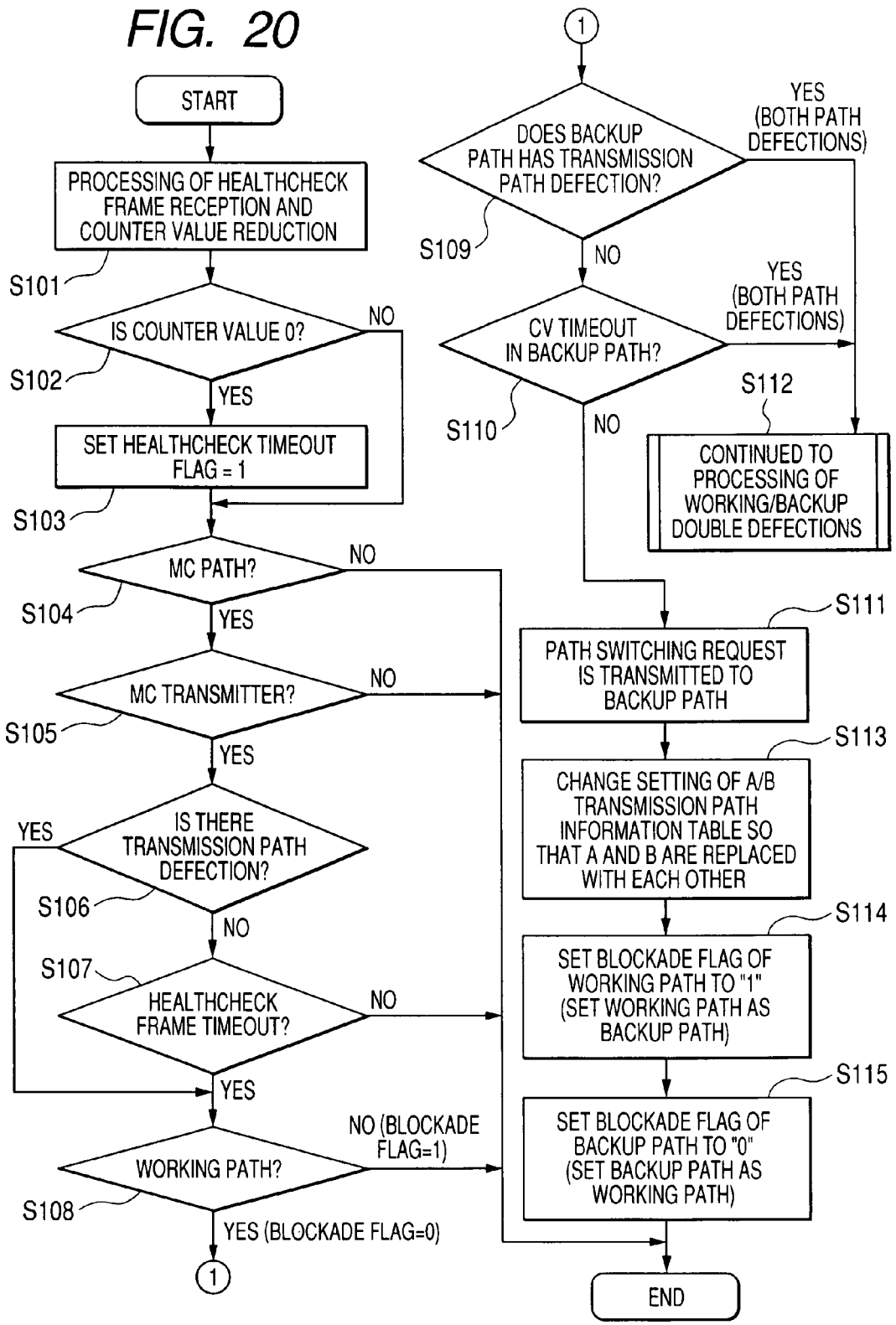
FIG. 20 is a flowchart of performing path switching.
Figure 22:
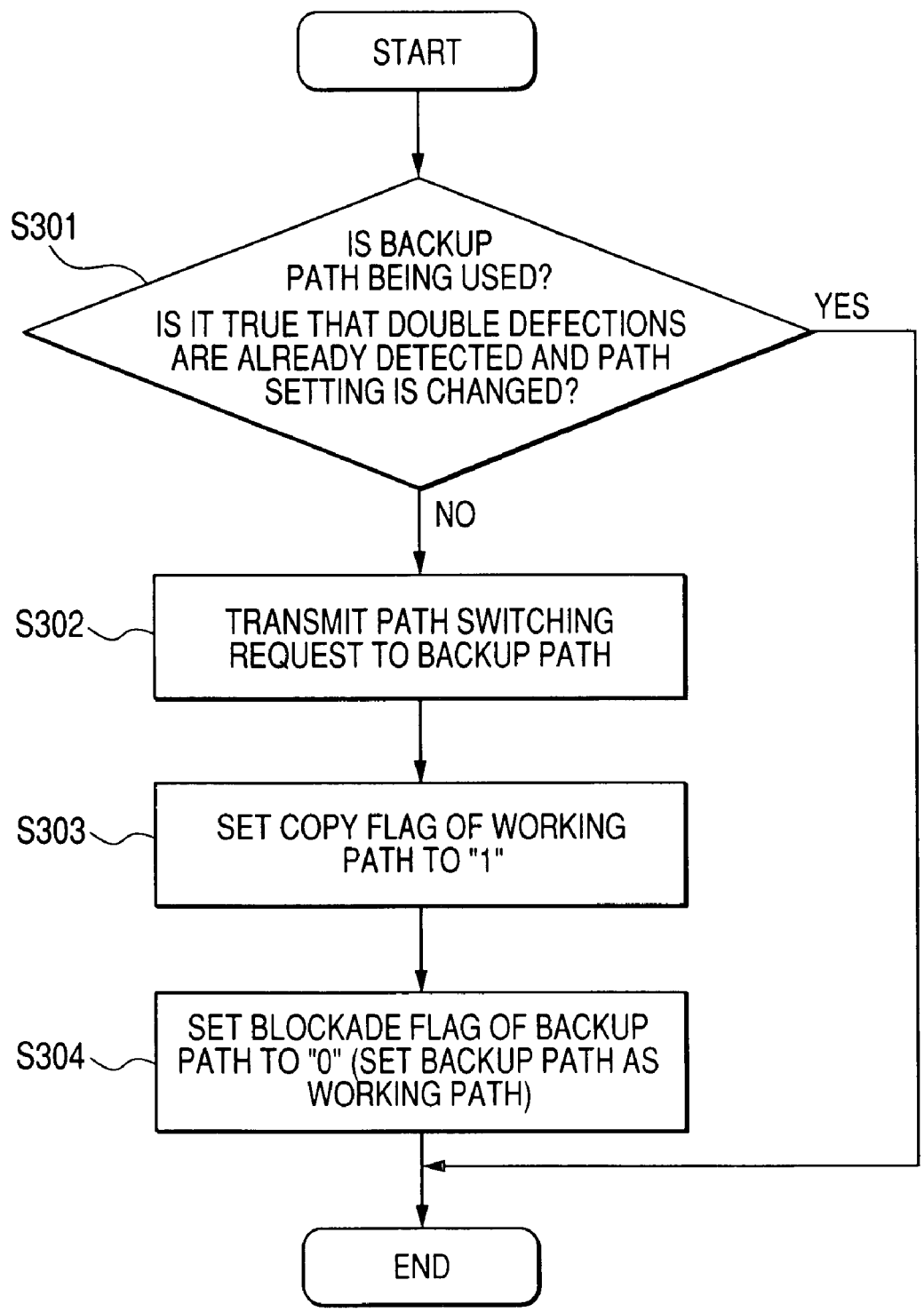
FIG. 22 is a flowchart of path switching when a double defection of the working path and the backup path occur.

A procedure in which the OAM sender 321 transmits the path switching request frame 3000 will be explained below using FIGS. 20 and 22. The OAM sender 321 performs periodically the flow shown in FIGS. 20, 22 to all the table entries. When the OAM sender 321 reads the logical path management table 320, it checks the entry valid flag 717. If the entry valid flag 717 is "1," namely, the entry is valid, a value of the healthcheck frame counter 716 is reduced by unity (Step S101). If as a result of reduction, the counter value becomes "0," the healthcheck frame timeout flag 711 is set to "1" indicating that the frame is not received within a fixed time period (Steps S102 and S103).

Next, the OAM sender 321 checks the MC path flag 712 to check whether this entry is of the multipoint logical path or of a point-to-point logical path (Step S104). Since means for switching a path of the point-to-point logical path is omitted in this explanation, the flow is assumed to come to END. In the case of the multipoint logical path, the OAM sender 321 checks the MC frame starting end flag 713 to check whether it is the user interface serving as the transmitting end of the multicast frame (Step S015). The switching of the multipoint logical path is initiated by the transmitting end node.

First, the transmission path defection flag 715 is checked to determine the existence/absence of a physical layer defect. If the determination result indicates the existence of a defect, the flow moves to processing of checking the need of switching the path (Step S106). If there is no transmission path defect, in order to verify normal reception of the path healthcheck frame, the healthcheck frame timeout flag 711 is checked. If the determination result indicates that the path healthcheck frame is not received within a fixed time period, it means that a logical path defect is occurring; therefore, the flow moves to processing of checking the need of path switching (Step S107). If the logical path healthcheck frame is received, the logical path has continuity normally; therefore, the flow is terminated.

Next, the blockade flag is checked to determine whether the path in which abnormality was detected is the working path or the backup path (Step S108). If the abnormal path is the backup path, there is no need to switch the path, and accordingly the flow is terminated.

If the abnormal path is the working path, switching of the path is needed. Therefore, a table entry of the backup path is acquired in order to check the existence/absence of a defect of the backup path next. Since the table entry of the backup path exists in an address obtained by inverting the most significant bit of the entry address of the working path, the entry is acquirable. When the OAM sender 321 receives the table entry of the backup path, it checks the existence/absence of a transmission path defect similarly as in Step S107. If there is a defect, it is determined that there is a working/backup path double defection, the flow moves to a double defection path shown in FIG. 22. Moreover, if there is no transmission path defect, reception of the healthcheck frame is checked similarly as in Step S108. If the healthcheck frame is not received within a fixed time period, the flow moves to the processing of the working/backup path double defection (Steps S109, S110, and S112).

If it turns out that there is no defect in the backup path, in order to switch from the working path to the backup path, a path switching request frame 3000 is created. An ID of information of a transmission path to be used after path switching is put in a field of the A/B transmission path information 3002 (for example, if a transmission path B will be used, "1" is inputted in the field). Moreover, the internal header 500 is given on the head of the path switching request frame 3000, which is stored in the OAM sender buffer 323. When giving the internal header 500, values of the logical path ID field 510 and the A/B transmission path information flag field 511 are created from the table entry address 700 of the backup path of the logical path management table 320, and are given (Step S111).

Setting values of the A/B transmission path information table 303 are changed to values that were specified for the A/B transmission path information 3002 of the path switching request frame 3000 (Step S113). By performing this processing, when searching the A/B transmission path information table 303 next time, an ID that is inverse to the ID of before the processing will be acquired, and therefore an entry acquired from the MPLS label assignment table 308 will also be an entry of the backup path, which is different from the entry of before the processing.

The blockade flag 710 of the logic path management table 320 entry that is used in the working path until the defect detection is set to "1" to effect path blockade (Step S114). The blockade flag 710 of an entry of the logical path management table 320 that was being used by the backup path until the defect detection is set to "0" to cancel the path blockade (Step S115).

Next, processing in the occurrence of the working/backup path double defection will be explained. When occurrence of the both path defects is determined in Step S110 or S111, the OAM sender 321 performs operations of a flowchart shown in FIG. 22. First, whether the blockade flag 710 of the backup path is "0" or not is determined. If it is "0," it means that the backup path is already used, and therefore the double defection is being bypassed, and accordingly the flow is terminated (Step S301).

If the blockade flag of the backup path is "1," in order to transmit the frame using the backup path, the path switching request frame 3000 is transmitted to the backup path. A procedure of transmitting the path switching request frame 3000 is the same as that of Step S112 (Step S302). By setting the MC copy flag 714 of the logical path management table entry of the working path to "1," the flow is so set that all the frames addressed to this logical path may be copied and transmitted (Step S303).

By setting the blockade flag 710 of the backup path to "0," the both paths are set as the working paths (Step S304). The above is the flow of the transmission procedure of the path switching request frame of the OAM sender 321.

Figure 21:
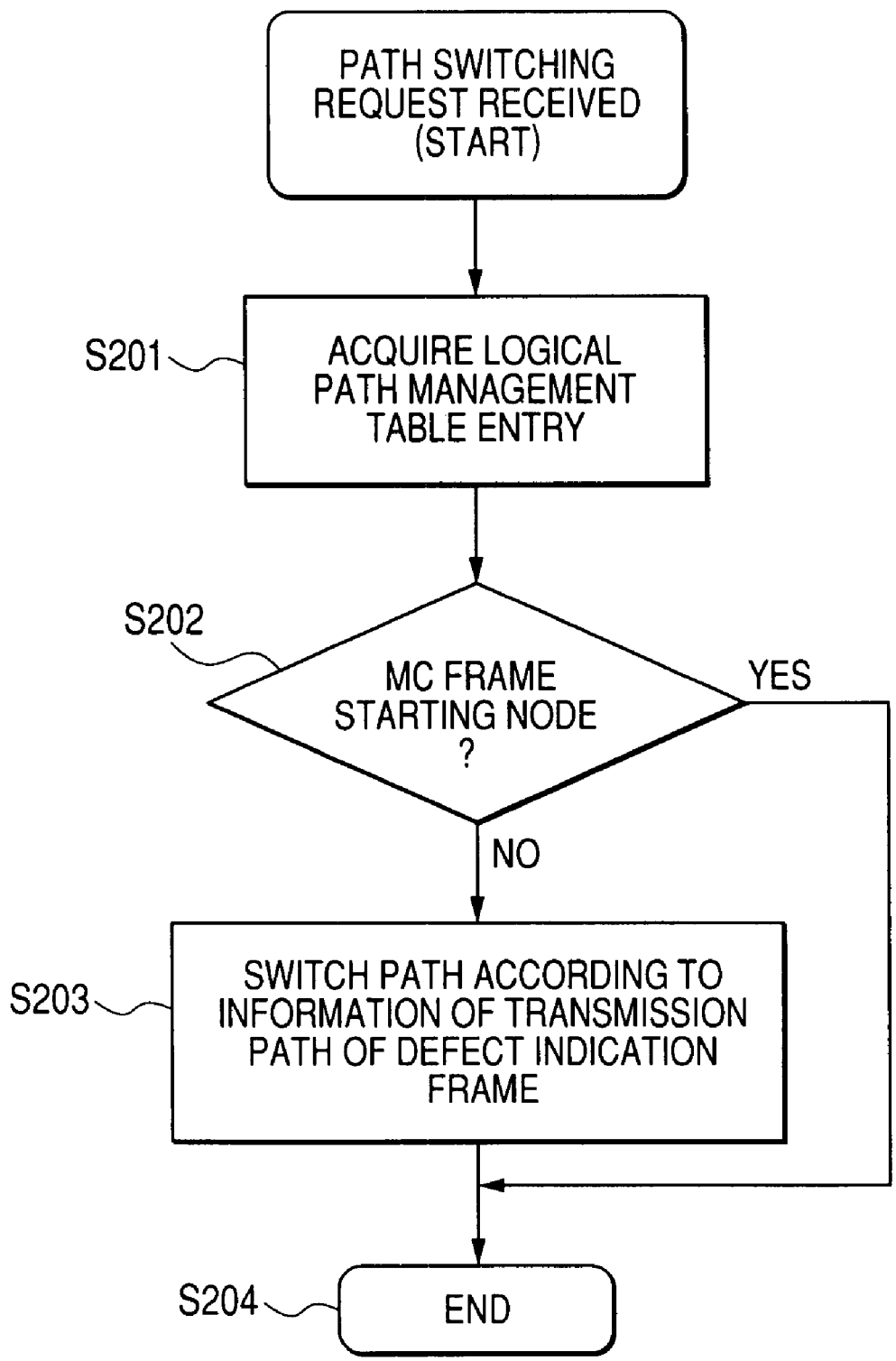
FIG. 21 is a flowchart of transmitting a path switching request frame.

Next, using FIG. 21, termination of the path switching request frame 3000 and a processing procedure of path switching by the OAM receiver 322 will be explained. When the OAM receiver 322 receives the path switching request, it acquires a logical path management table entry (Step S201). An acquisition procedure of the logical path management table is the same as that in the reception processing of a data frame.

When the OAM receiver 322 acquires the logical path management table, it determines whether the local user interface is a user interface of the multicast-frame transmitting end from the MC frame starting end flag 713. When the MC frame starting end flag is "1," it means that the path switching request frame forwarded from the local user interface returns to itself after going around the ring, the flow is terminated without doing anything. On the other hand, when the MC frame starting end flag 713 is "0," it means that the local use IF is the receiving end IF, and accordingly the flow proceeds to the next step (Step S202). Then, the blockade flag of the acquired logical path management table entry is set to "0" (blockade cancel), and a value of the blockade flag 710 of an entry (corresponding to the side A/side B of the logical path) that is obtained by inverting the most significant bit of a search address of the acquired logical path management table entry is set to "1" (blockade) (Step S203). The above is the flow of termination and a processing procedure of path switching by the OAM receiver 322. Setting the blockade flag of the logical path management table entry to "0" enables the multicast receiving node user interface to receive a frame from the new working path.

Up to this point, a defect detection operation, a defect indication operation, and a logical path switching operation in the occurrence of the defect in a single node were explained. Below, a flow of defect detection, defect indication, and logical path switching in the whole network system in the case where a defect occurs in the ring network will be explained using FIGS. 12 to 19 and FIGS. 23, 24.

Figure 12:
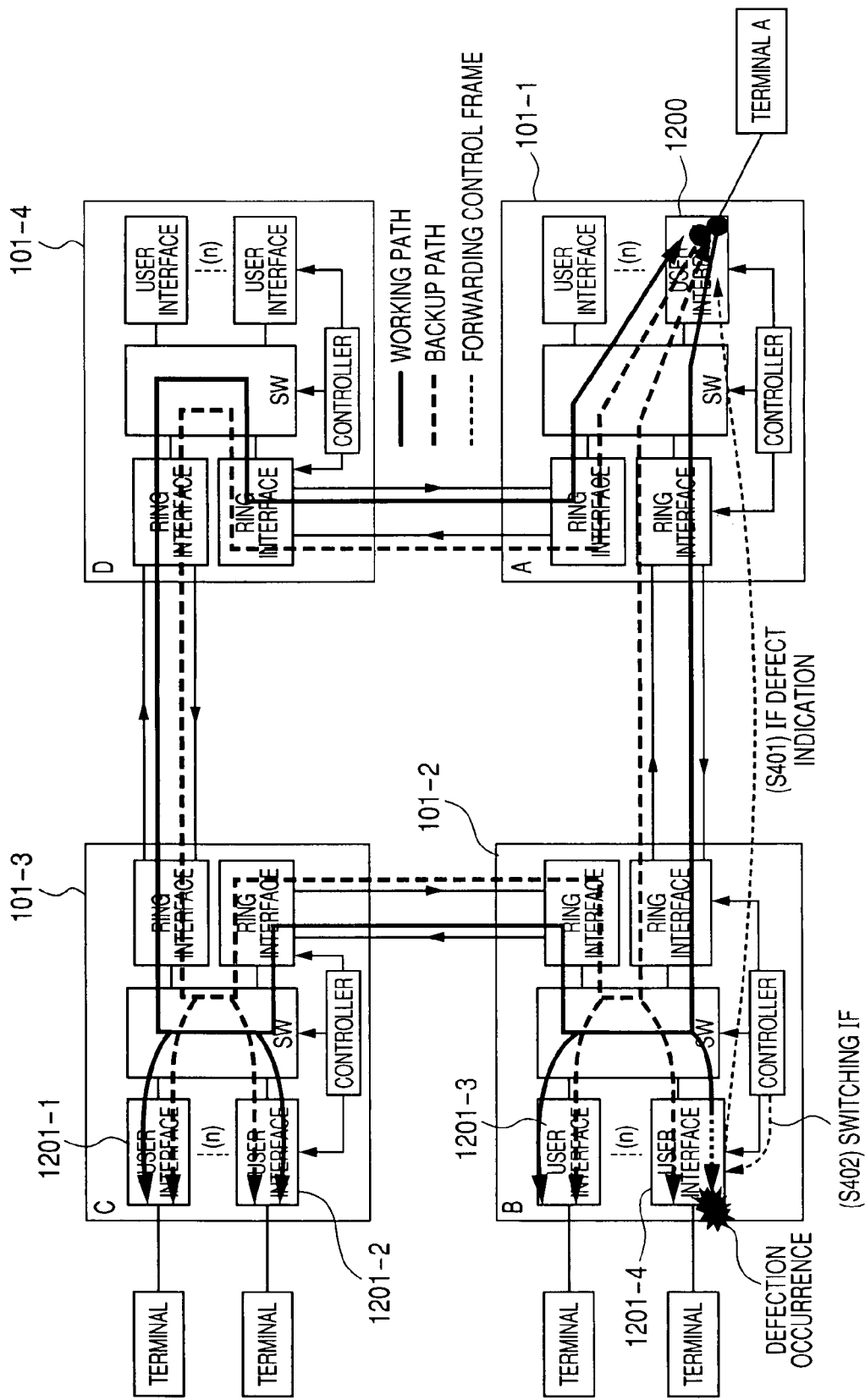
FIG. 12 a diagram showing a state where a defect is occurring in the user interface on the multipoint logical path configured on the ring network constructed with the nodes of this invention.
Figure 23:
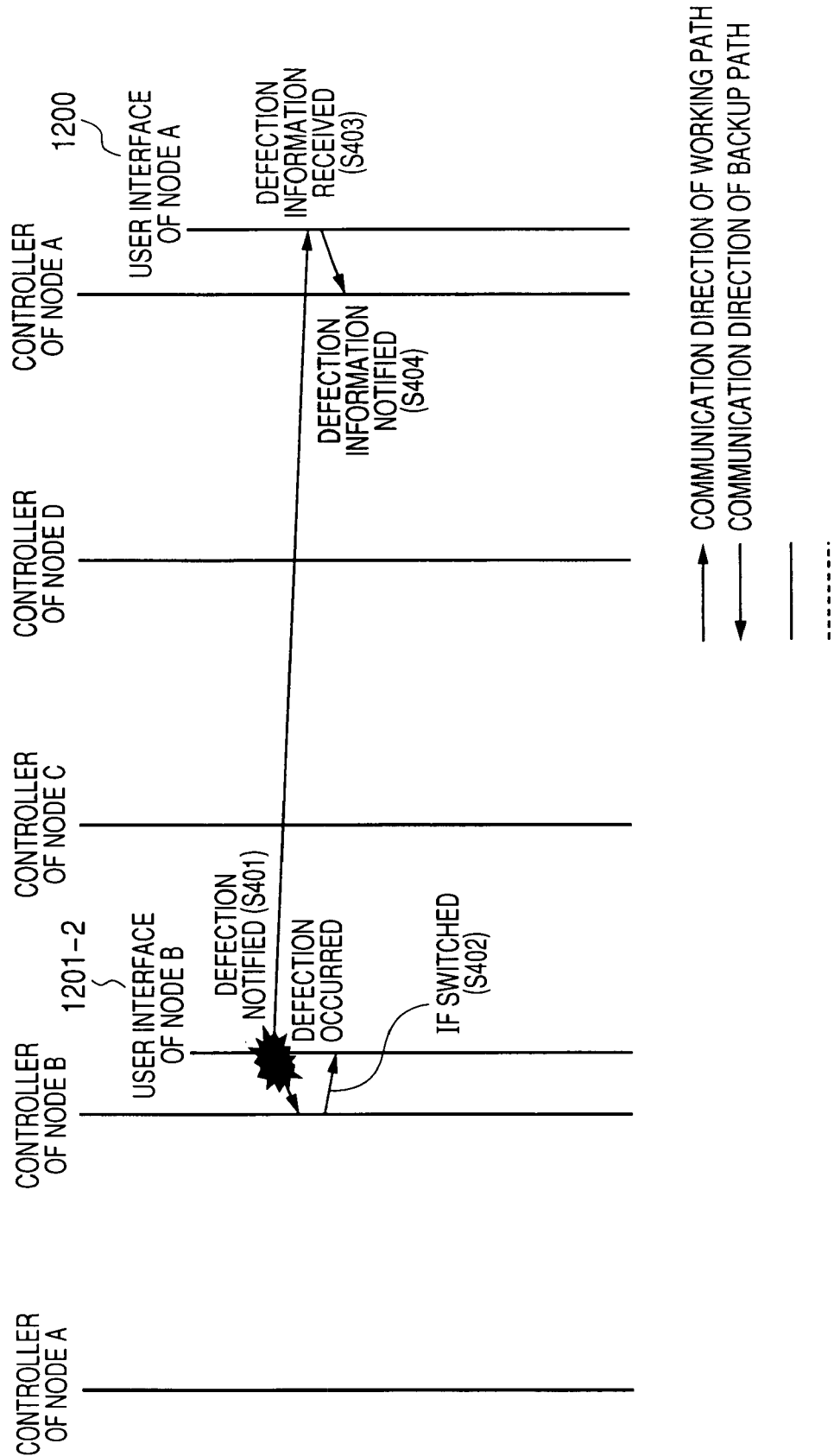
FIG. 23 is a diagram for explaining a defect detection sequence in the occurrence of the defect shown in FIG. 12.

FIG. 12 and FIG. 23 are diagrams for explaining defect detection and a defect indication procedure when a defect occurs in a user interface 1201-1 of the node B101-2.

Conceivable defects that may occur in the user interface 2001-4 include logical path cutoff, a failure of an optical module of the user interface, etc. In such cases, a user interface 1201-4 having detected a defect notifies the defect to the working multipoint logical path and a controller of the node B. Defect indication to the multipoint logical path is done using the defect indication frame 3200 (Step S401).

The node B101-2 having the user interface in which the defect is occurring can detect the occurrence of the defect by referring to the logical path table entry of the user interface in which the defect is occurring or a direct notification of the defect from the user interface 1201-4. At this time, in the case where the user interface 1201-4 is constructed with a redundant configuration, it is desirable to switch the interface (Step S402). Switching the interface makes possible normal reception of the multicast frame.

The defect indication frame 3200 transmitted from a user interface 1200 of the node B is forwarded to the user interface 1200 of the multicast-frame transmitting end node after going around the multipoint logical path (Step S403). Since it is the backward defect indication frame, the user interface determines that it is unnecessary to switch the multipoint logical path. The user interface notifies defect information to the controller of the node A (Step S404). The above procedure makes it possible to specify a defect position of the user interface of the multicast-frame receiving end node.

The defect of the user interface 1201-4 does not affect other user interfaces of the multicast-frame receiving end. Therefore, it is desirable that the user interface 1200 of the multicast-frame transmitting end node only notifies the defect information to the controller, not switching the multipoint logical path. Thus, regarding a defect occurring in the node that serves as a multicast-frame receiving end, it is desirable that the defection is handled within the node, not switching the multipoint logical path.

In the system in which the backward defect indication frame is forwarded using the multipoint logical path, the backward defect indication frame is transmitted also to the user interfaces 1201-1 to -3 of other multicast-frame receiving ends. It also becomes possible for all the nodes to share information about which type of defect is occurring and where it is occurring by letting each user interface terminate this backward defect indication frame.

Moreover, it is also conceivable that a defect occurred in the user interface of this alone node has no relation with other multicast-frame receiving ends. Then, it is desirable that each receiving end user interface discards the backward defect indication frame 3200 by filtering. Doing so can reduce a load of notifying the controller of information having no relation with frame reception by the local node.

Figure 13:
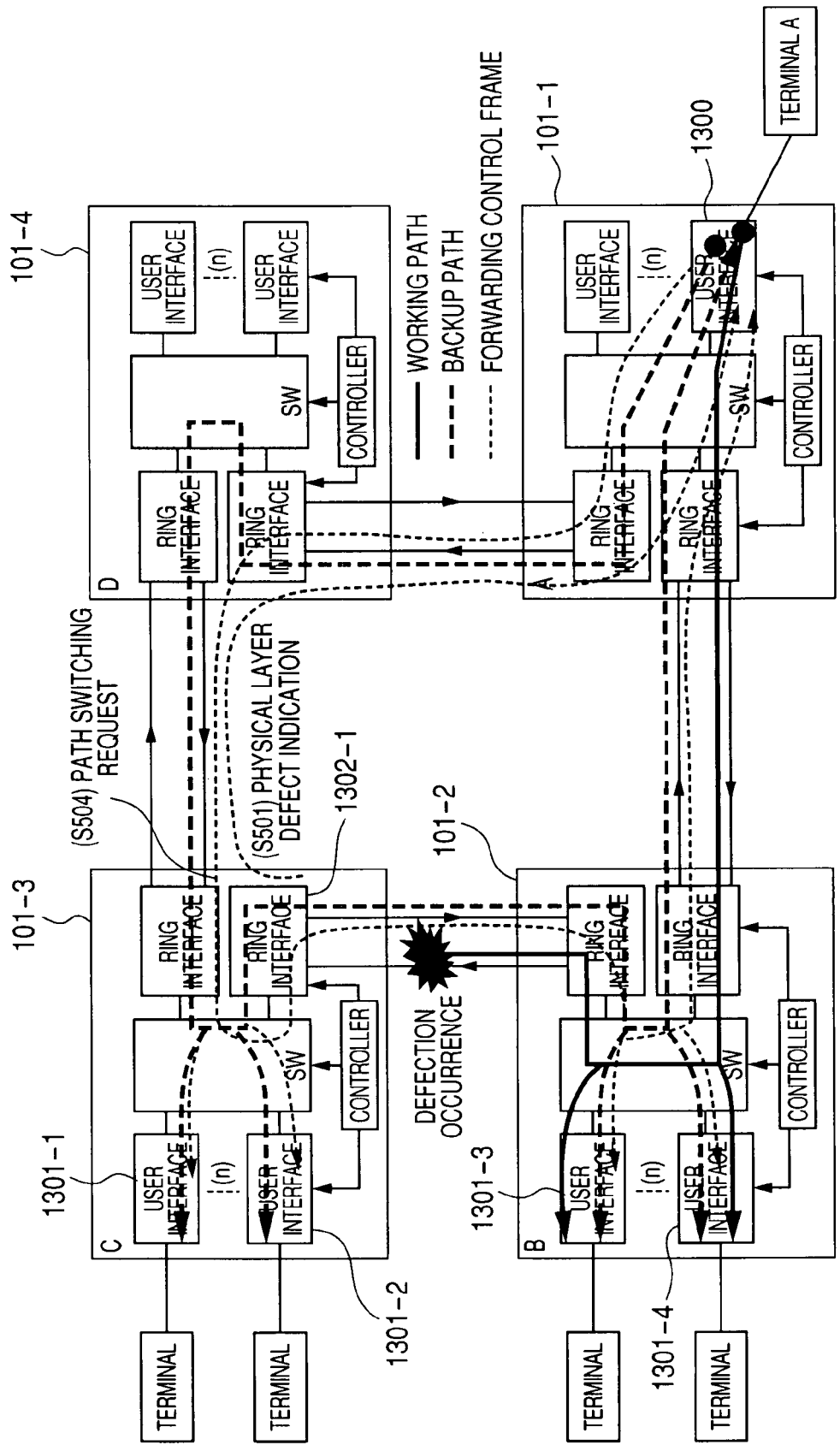
FIG. 13 is a diagram showing a state where a defect is occurring in a transmission path A of the ring network constructed with the nodes of this invention.
Figure 24:
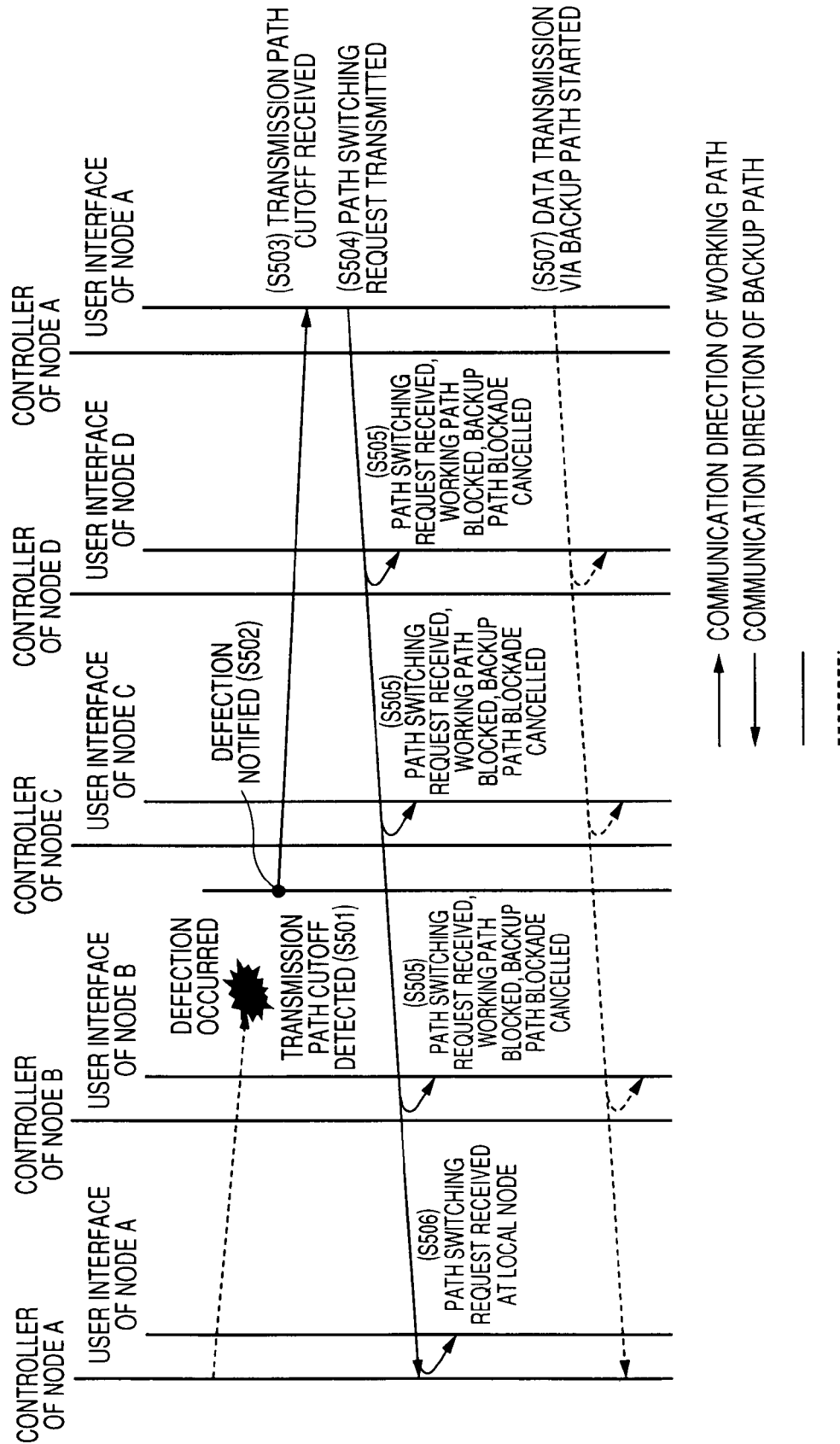
FIG. 24 is a diagram for explaining defect detection in the occurrence of the defect shown in FIG. 13 and a sequence of path switching.

FIG. 13 and FIG. 24 are diagrams for explaining defect detection when a defect occurs in the transmission path A (the working path) between the node B and the node C by, for example, break of optical fiber etc., and a defect indication procedure. The defect of the transmission path A can be detected by being notified from an optical module of the ring interface to the logical path management unit 420 as Loss information (Step S501). A ring interface 1302-1 that detects the defect transmits the forward defect indication frame 2800 to all the logical paths including the multipoint logical path shown in the figure using the transmission path A (Step S502).

By receiving the forward defect indication frame from the working path, a user interface 1300 of the multicast-frame transmitting end recognizes that there is the possibility of existence of the user interface failed to receive the multicast frame (Step S503). At this time, the existence/absence of a defect in the backup path is checked from the path management table. If the user interface 1300 verifies that there is no defect in the backup path, it transmits the path switching request frame 3000 to the backup path that is the transmission path B (Step S504).

The path switching request frame 3000 is transmitted to user interfaces 1301-1 to -4 via the backup multipoint logical path. The user interfaces 1301-1 to -4 that receive the path switching request frame 3000 perform processing of path switchover to a path specified by the A/B transmission path information 3002 (Step S505). The path switching request frame 3000 transmitted via the backup multipoint logical path is terminated at the transmitting end node (Step S506).

After the user interface 1300 of the node A transmits the path switching request frame 3000 to the backup multipoint logical path, it starts data transmission to the backup path (Step S507). The above is the path switching procedure in the occurrence of a transmission path defect in the working path. The use of this function enables forwarding of the multicast data to be continued even when a defect occurs in the transmission path of the working path by switching over to the backup path. Moreover, since the multipoint logical path goes around the ring, it becomes possible to switch the path without specifying a defect occurrence point; therefore, management of the passing through nodes becomes unnecessary.

In this embodiment, it is assumed that the user interface 1300 of the node A starts data transmission via the backup path after transmitting the path switching request frame 2800. However, by starting data transmission via the backup path after terminating the path switching request frame 2800 by the local node itself, the user interface 1300 can transmit the data via the backup path after all the user interfaces that are to receive the multicast frame have completed path switching processing, and accordingly frame destruction by switching can be prevented.

Figure 14:
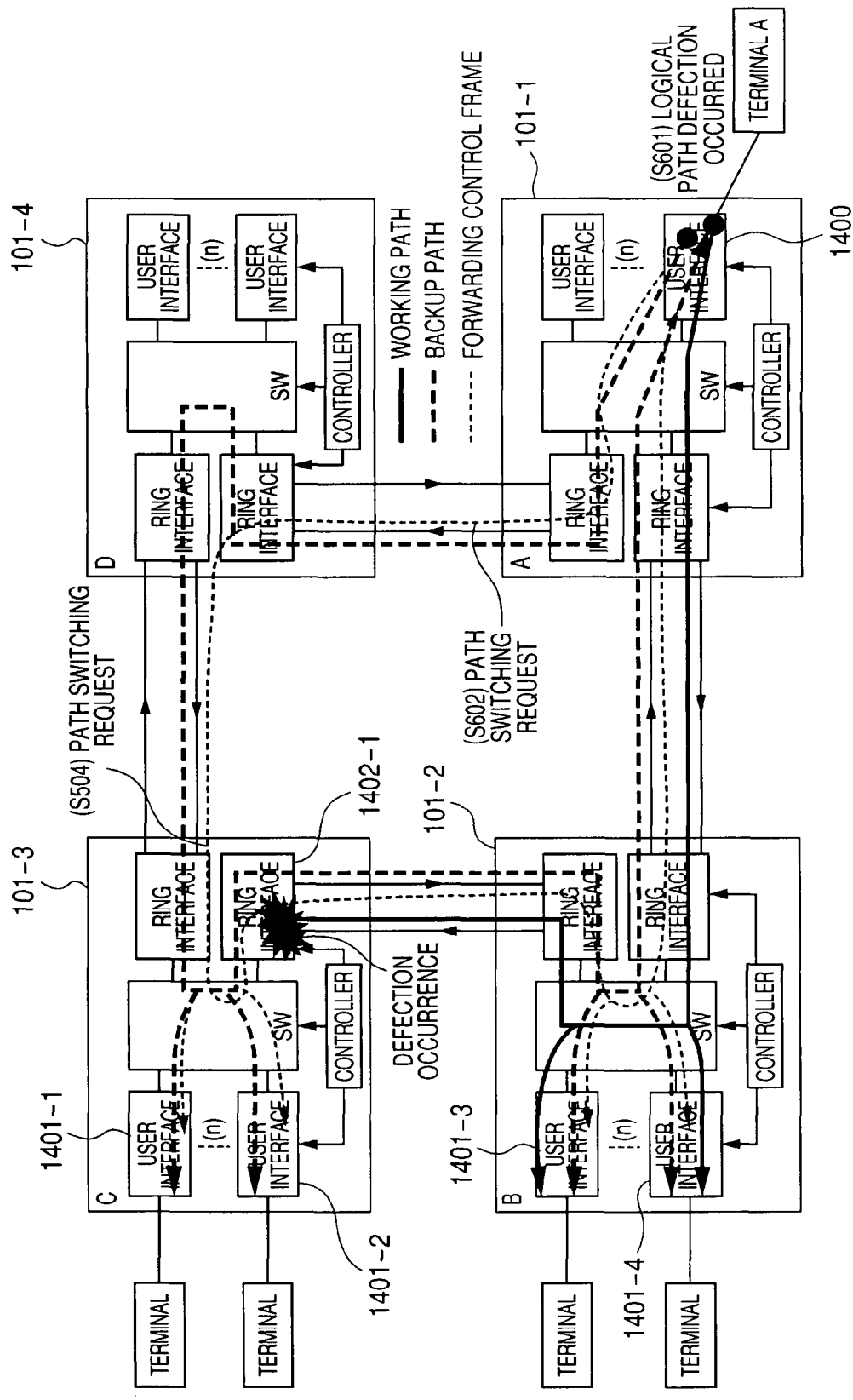
FIG. 14 is a diagram showing a state where a defect is occurring in the multipoint logical path configured on the ring network constructed with the nodes of this invention.
Figure 25:
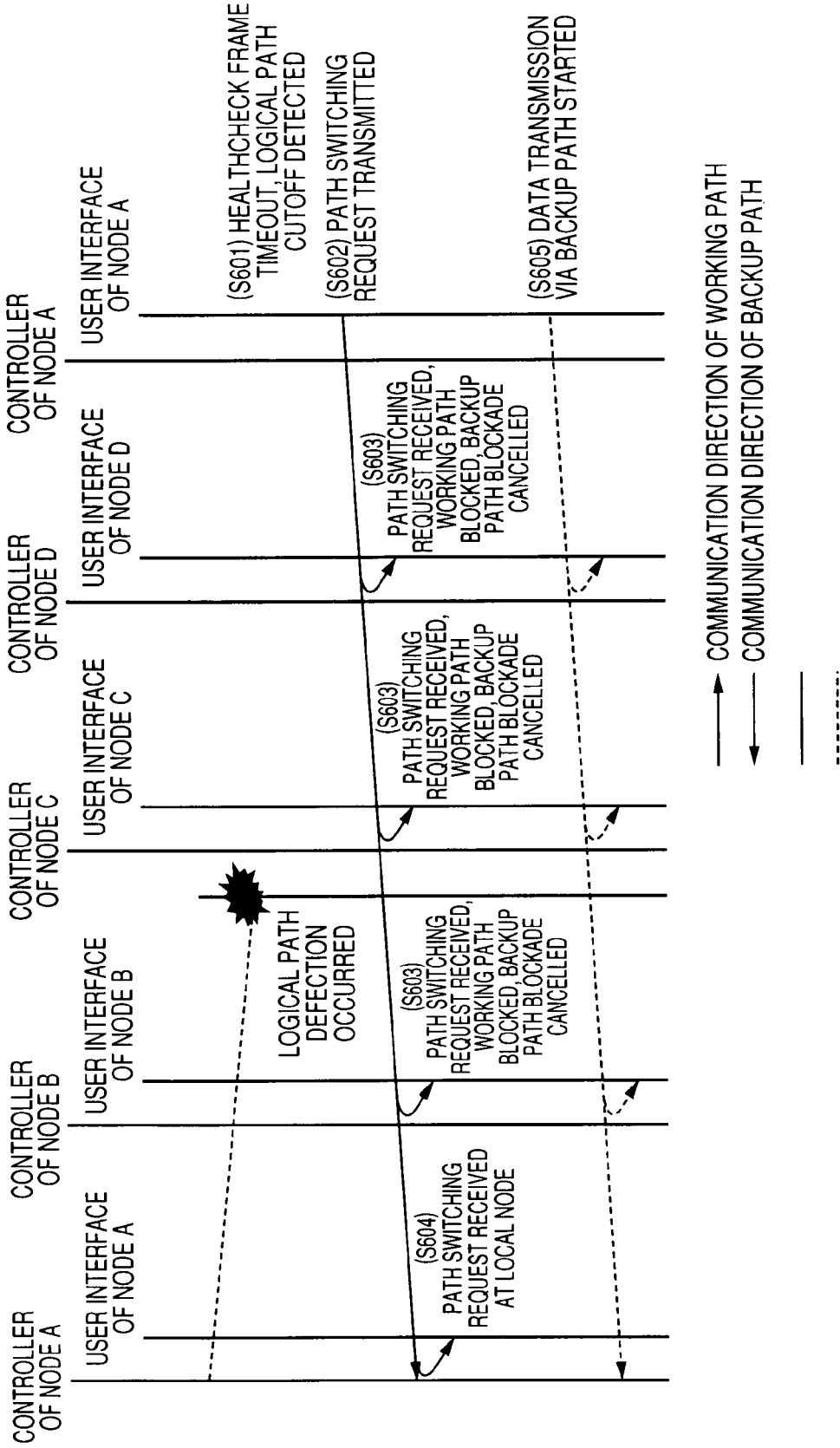
FIG. 25 is a diagram for explaining defect detection in the occurrence of the defect shown in FIG. 14 and a sequence of path switching.

FIG. 14 and FIG. 25 are diagrams for explaining defect detection when a logical path defect occurs in the working path and a defect indication procedure. Here, it is assumed that the logical path is cut off by an event that an entry of the MPLS label search table 402 of a ring interface 1402-1 of the node C is deleted by a human error or is erroneously set up.

When a defect occurs in the logical path, since the interface in which the defect occurs cannot recognize the defect, it cannot transmit the forward defect indication frame. Such a defect can be detected by knowing that the healthcheck frame from the user interface serving as a starting point of the logical path is not received within a fixed time period. In the case of the multipoint logical path, a user interface 1400 checks the health of the logical path by receiving the healthcheck frame transmitted by the local node itself. When a defect occurs in the logical path, the healthcheck frame does not return, and therefore a logical path defect can be detected (Step S601).

At this time, the user interface 1400 checks the existence/absence of a defect of the backup path from the path management table. If the user interface 1400 verifies that there is no defect in the backup path, it transmits the path switching request frame 3000 to the backup path that is the transmission path B (Step S602).

The path switching request frame 3000 is transmitted to user interfaces 1401-1 to -4 via the backup multipoint logical path. The user interfaces 1401-1 to -4 that receive the path switching request frame 3000 conduct processing of path switchover to a path specified by the A/B transmission path information 302 (Step S603). The path switching request frame 3000 forwarded via the backup multipoint logical path is terminated at the transmitting node (Step S604).

After the user interface 1400 of the node A transmits the path switching request frame 3000 to the backup multipoint logical path, it starts data transmission to the backup path (Step S605). The above is the path switching procedure when a logical path defect occurs in the working path. The use of this function enables forwarding of the multicast frame to be continued even when a defect occurs in the multipoint logical path of the working path by switching over to the backup path. Moreover, since the multipoint logical path goes around the ring, it becomes possible to switch the path without specifying a defect occurrence point; therefore, management of the passing through nodes becomes unnecessary.

Here, it is assumed that the user interface 1400 of the node A starts data transmission via the backup path after transmitting the path switching request frame 2800. By starting data transmission via the backup path after terminating the path switching request frame 2800 at the local node itself, all the user interfaces that are to receive the multicast frame are enabled to transmit data via the backup path after completion of the path switching processing. Therefore, frame destruction by switching can be prevented.

Figure 15:
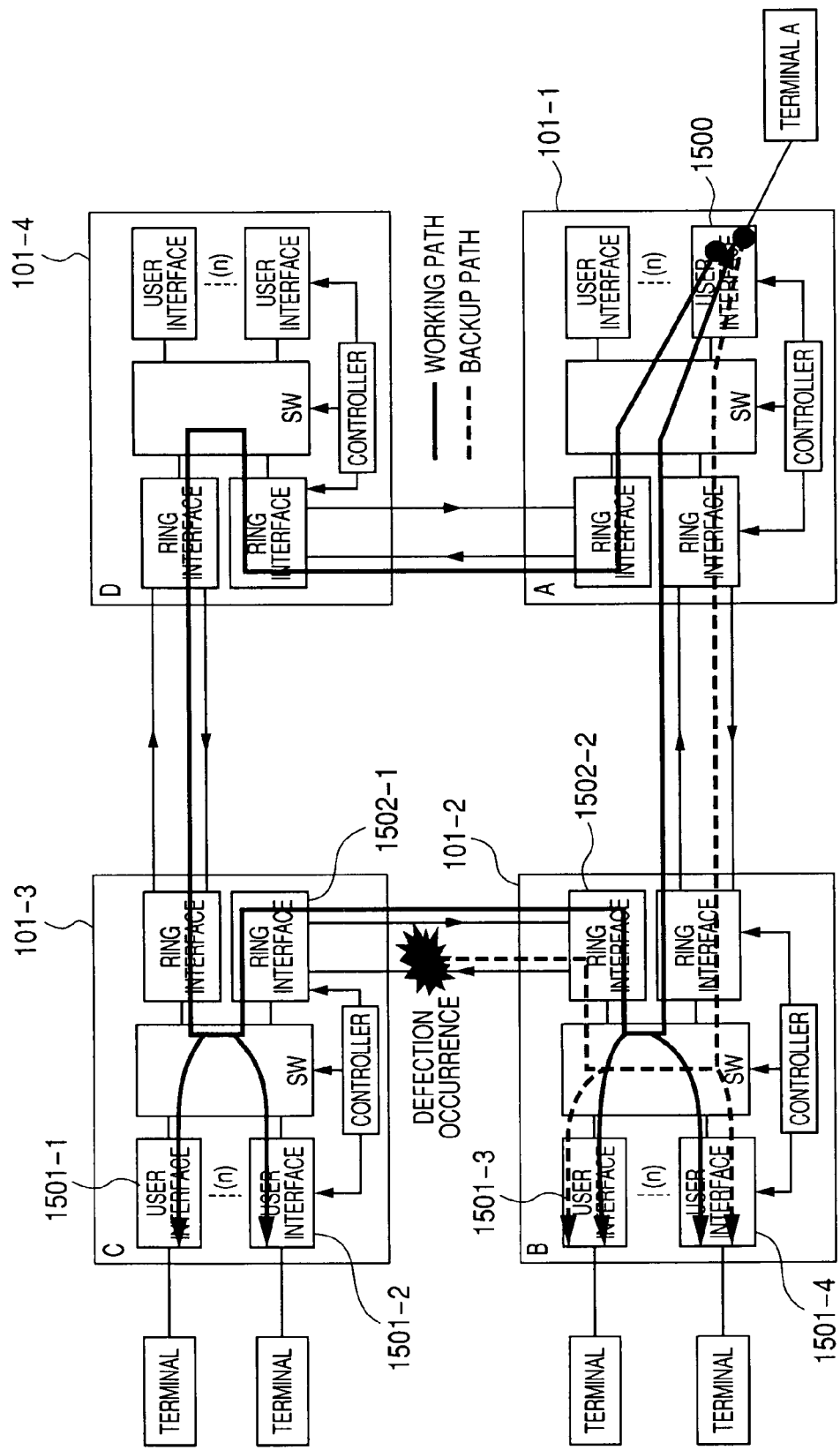
FIG. 15 is a diagram showing a state where the multipoint logical path is switched from a working path to a backup path.

FIG. 15 shows frame forwarding via the multipoint logical path after having switched the multipoint logical path to the backup path when such a defect in the working path as shown in FIGS. 13 and 14 was detected. Switching the multipoint logical path to the transmission path B enables the forwarding of the multicast frame to be continued.

Figure 16:
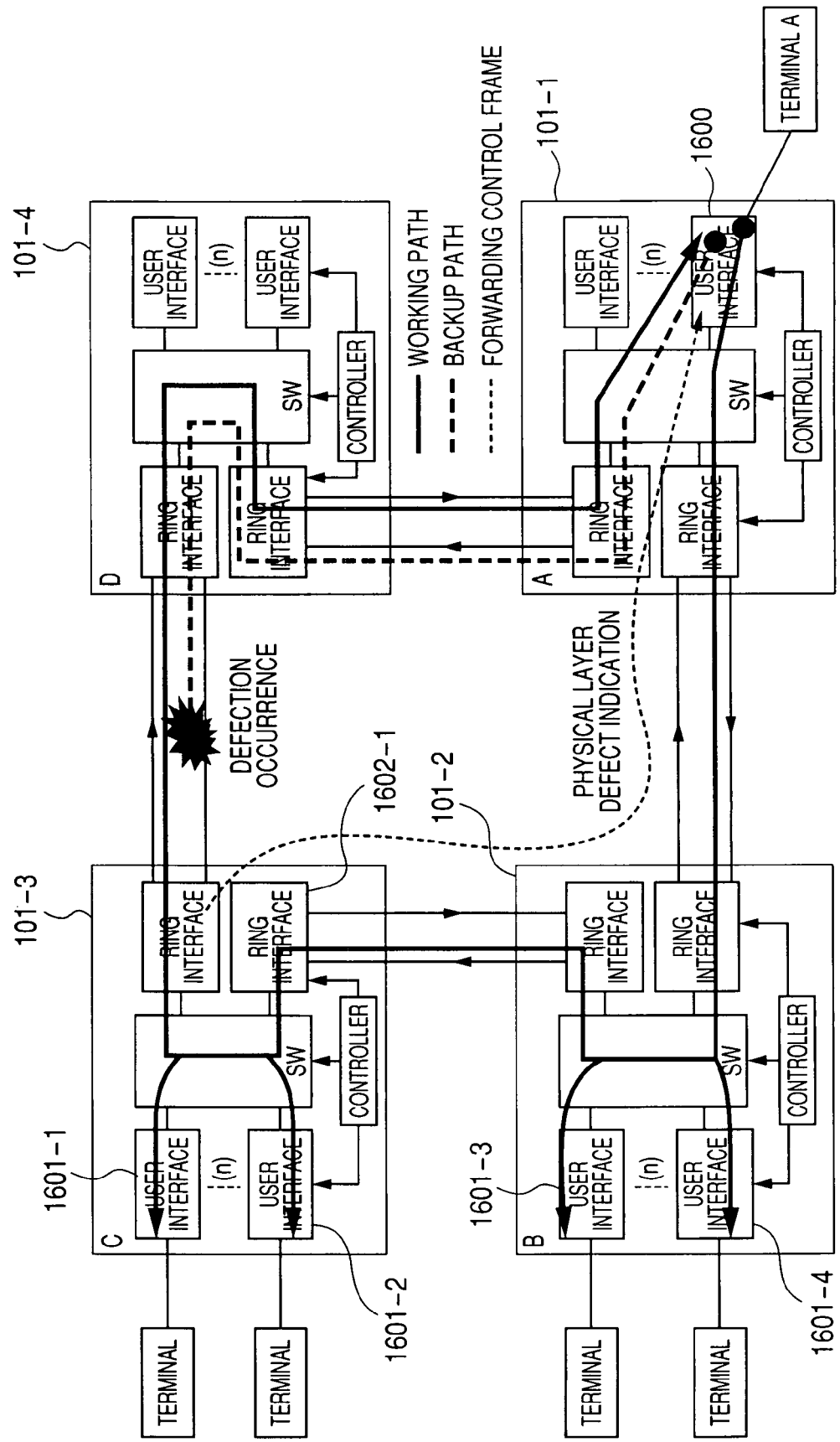
FIG. 16 is a diagram showing a state where a defect is occurring in a transmission path B of the ring network constructed with the nodes of this invention.

FIG. 16 is a diagram for explaining defect detection when a defect occurs in a transmission path by, for example, break of optical fiber etc. in the transmission path B (backup path) between the node C and the node D, and a defect indication procedure. A defect of the transmission path B can be detected by being notified from the optical module of the ring interface to the logical path management unit 420 as Loss information. A ring interface 1302-1 that detects the defect transmits the forward defect indication frame 2800 to all the logical paths including the multipoint logical path shown in the figure using the transmission path B.

The user interface 1300 of the multicast-frame transmitting end recognizes that a defect is occurring in the transmission path B by receiving the forward defect indication frame 2800. However, since the transmission path B is used as the backup path, the defect does not affect transmission of the multicast frame. Therefore, a user interface 1600 reports only defect information to the controller and dose not conduct path switching.

Although not shown in the figure, when a defect occurs in the logical path of the backup path, the defect of the multipoint logical path can be detected by the defect detection procedure of the logical path explained by referring to FIGS. 14 and 25. In addition, in this case, the logical path is not switched because of the same reason as in the defect detection in the backup path.

Figure 17:
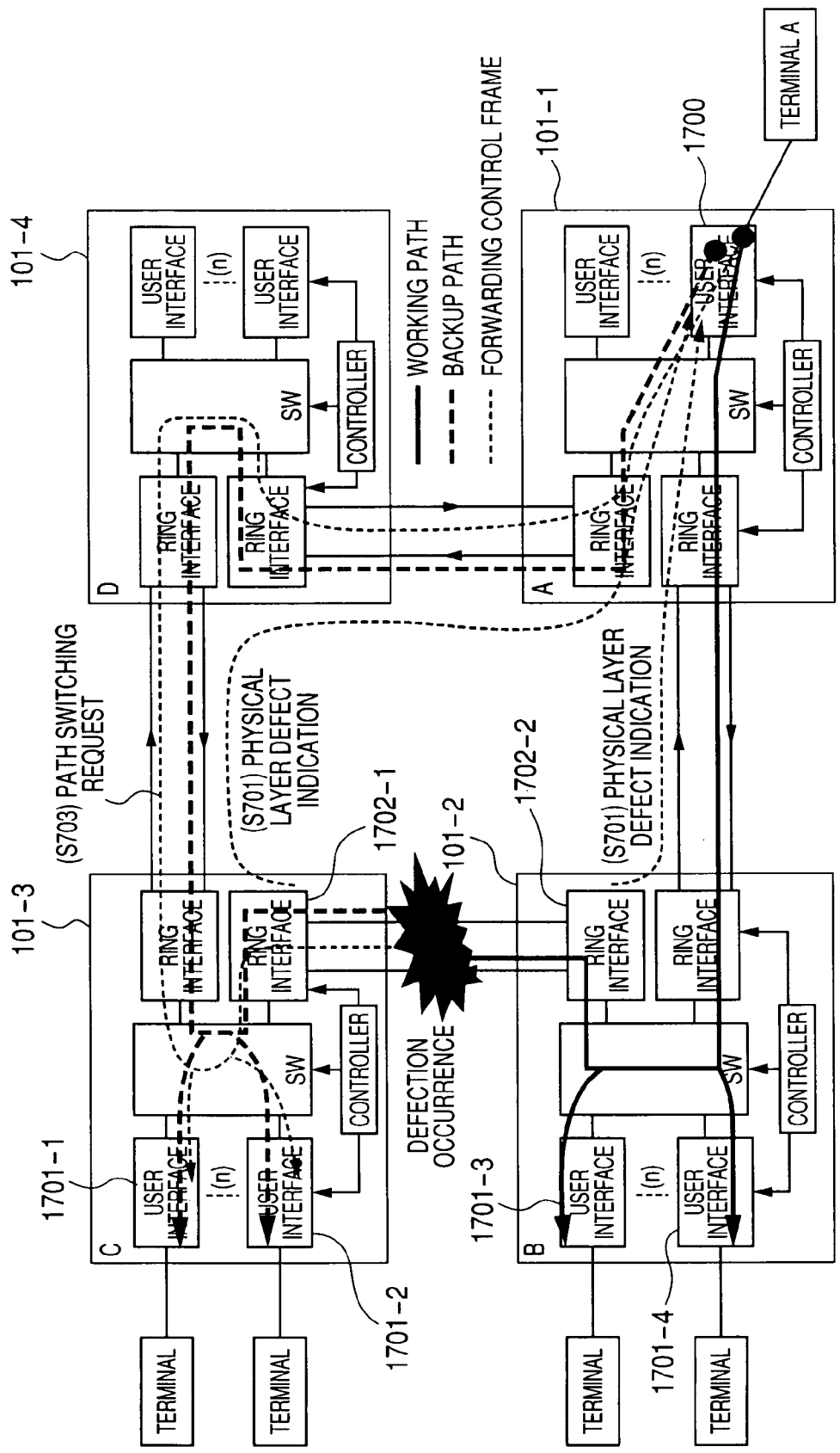
FIG. 17 is a diagram showing a state where defects are occurring both in the transmission path A and in the transmission path of the ring network constructed with the nodes of this invention.
Figure 26:
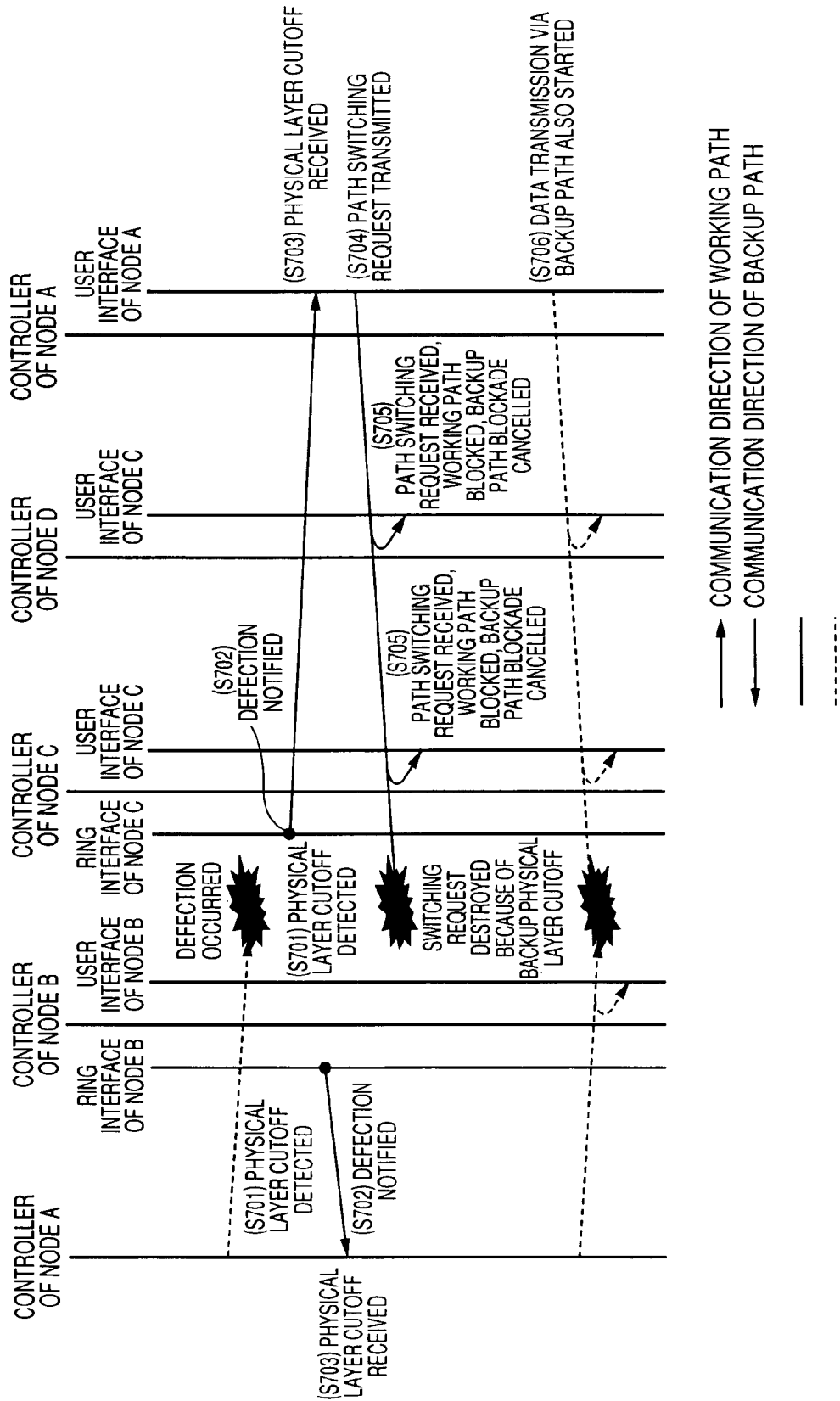
FIG. 26 is a diagram for explaining defect detection in the occurrence of the defect shown in FIG. 17 and a sequence of path switching.

FIG. 17 and FIG. 26 are diagrams for explaining defect detection when defects occur both in the transmission path A (the working path) and in the transmission path B (the backup path) between the node B and the node C by, for example, break of optical fiber etc., and a defect indication procedure. The defect of the transmission path A and the defect of the transmission path B are notified to the logical path management unit 420 of the respective ring interfaces from the optical module of a ring interface 1702-1 and from the optical module of a ring interface 1702-2, respectively, as Loss information, whereby these defects can be detected (Step S701).

The ring interface 1702-1 and the ring interface 1702-2 that detect the defect using the transmission path A and the transmission path B, respectively, to transmit the forward defect indication frame 2800 to all the logical paths including the multipoint logical path shown in the figure (Step S702).

The user interface 1300 of the multicast-frame transmitting end recognizes that defects are occurring in the both paths, the working path and the backup path, by receiving the forward defect indication frames 2800 both from the working path and from the backup path (Step S703). In such a case where defects occur in the both paths of the working path and the backup path, in order to forward the multicast frame to all the user interfaces, the backup path is used for doing so for a user interfaces 1701-1 and a user interface 1701-2, and the working path is used for doing so for a user interfaces 1701-3 and a user interface 1701-4, whereby forwarding of the multicast frame can be attained. Therefore, the path switching request frame 3000 is transmitted to the backup path so that the data frame can be transmitted via the backup path to the user interfaces 1701-1 and 1701-2 to which the data frame cannot be transmitted via the working path (Step S704).

The path switching request frame 3000 is transmitted to the user interfaces 1701-1 and -2 via the backup path. The user interfaces 1701-1 and -2 that receive the path switching request frame 3000 switch paths from the current path to a path specified by the A/B transmission path information 302.

A user interface 1700 of the node A sets the MC copy flag 714 of the logical path management table 320 to "1," rendering the flag valid, so that the frame can be forwarded also to the backup path. By doing so, the data frame will be copied and forwarded both to the working path and to the backup path. Therefore, the multicast frame can be forwarded to all the user interfaces (Step S706). The above is the path switching procedure when transmission path defects occur both in the working path and in the backup path simultaneously. Using this function, even when defects occurs both in the working path and in the backup path simultaneously, the transmitting end node copies the frame and forwards it also to the backup path, whereby it becomes possible to continue forwarding the multicast frame.

Figure 18:
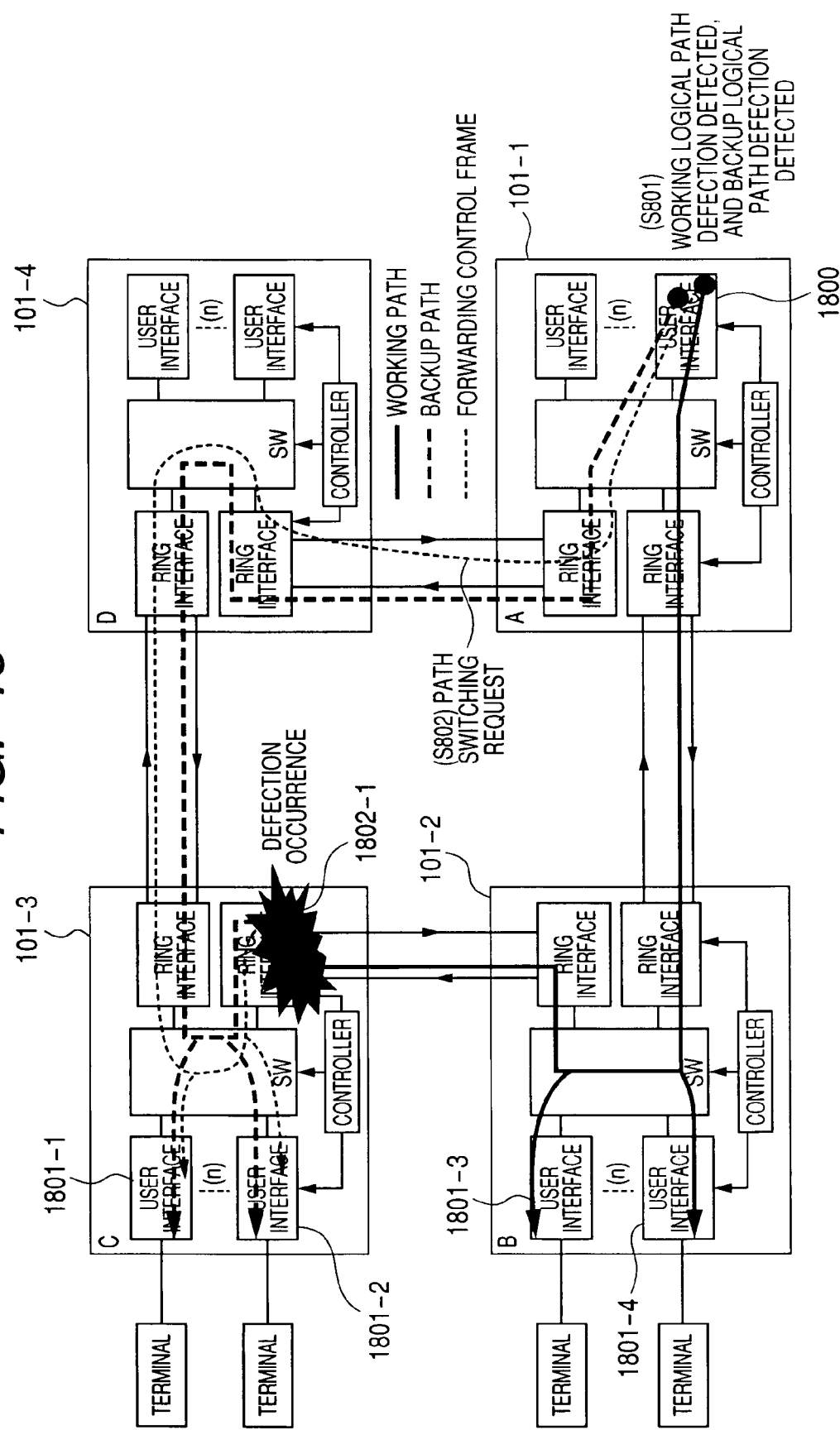
FIG. 18 is a diagram showing a state where defects are occurring both in the working multipoint logical path and in the backup multipoint logical path, respectively, both being configured on the ring network constructed with the nodes of this invention.
Figure 27:
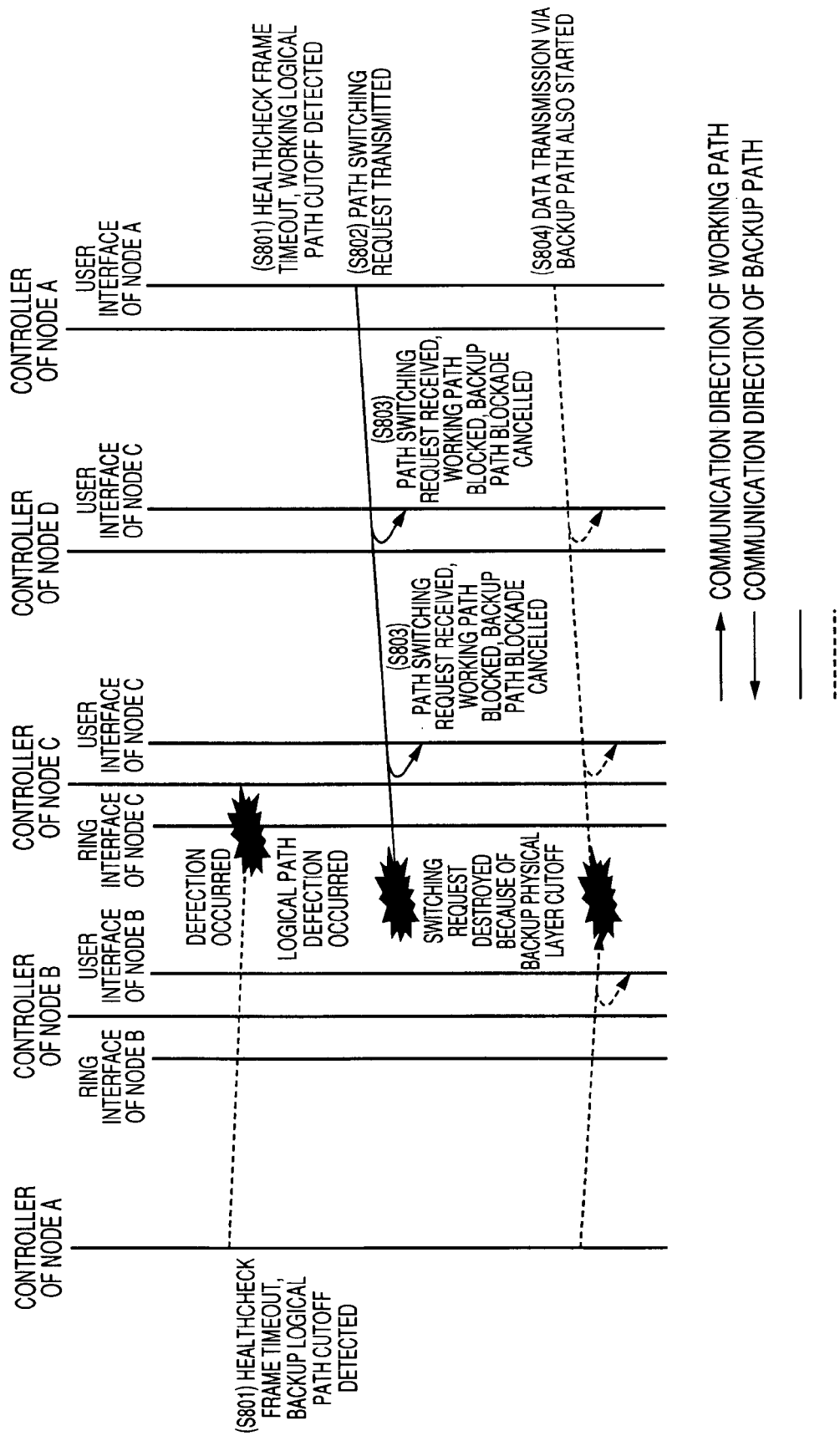
FIG. 27 is a diagram for explaining defect detection in the occurrence of the defect shown in FIG. 18, and a sequence of path switching.

FIG. 18 and FIG. 27 are diagrams for explaining defect detection and a defect indication procedure when logical path defects occur both in the working path and in the backup path. Here, it is assumed that entries for the working path and for the backup path of the MPLS label search table 402 of a ring interface 1802-1 of the node C are deleted by a human error or are set up erroneously, and consequently the logical path is cut off.

If a defect occurs in the logical path, the interface in which the defect occurs is unable to transmit the forward defect indication frame because of incapability of recognizing the defect. Such defects can be detected by knowing that the healthcheck frame from the user interface serving as the starting point of the logical path is not received within a fixed time period. In the case of the multipoint logical path, a user interface 1800 checks the health of the logical path by receiving the healthcheck frame transmitted by the local node itself. If the defect occurs in the logical path, the healthcheck frame does not return and accordingly the logical path defect can be detected. At this time, the user interface 1800 can recognize that path defects are occurring both in the working path and in the backup path simultaneously from the path management table (Step S801).

When defects occurs in the both paths, the working path and the backup path, as in this case, forwarding of the multicast frame to all the user interfaces can be attained by using the backup path to forward it to a user interface 1801-1 and a user interface 1801-2 and by using the working path to forward it to a user interface 1801-3 and a user interface 1801-4. In order to do this, the path switching request frame 3000 is transmitted to the backup path so that the data frame can be transmitted via the backup path to the user interfaces 1801-1 and 1801-2 to which the data frame cannot be transmitted currently via the working path (Step S802).

The path switching request frame 3000 is transmitted to the user interfaces 1801-1 and -2 via the backup path. Each of the user interfaces 1801-1 and -2 that receive the path switching request frame 3000 performs processing of path switchover to a path specified by the A/B transmission path information 302 (Step S803).

Figure 19:
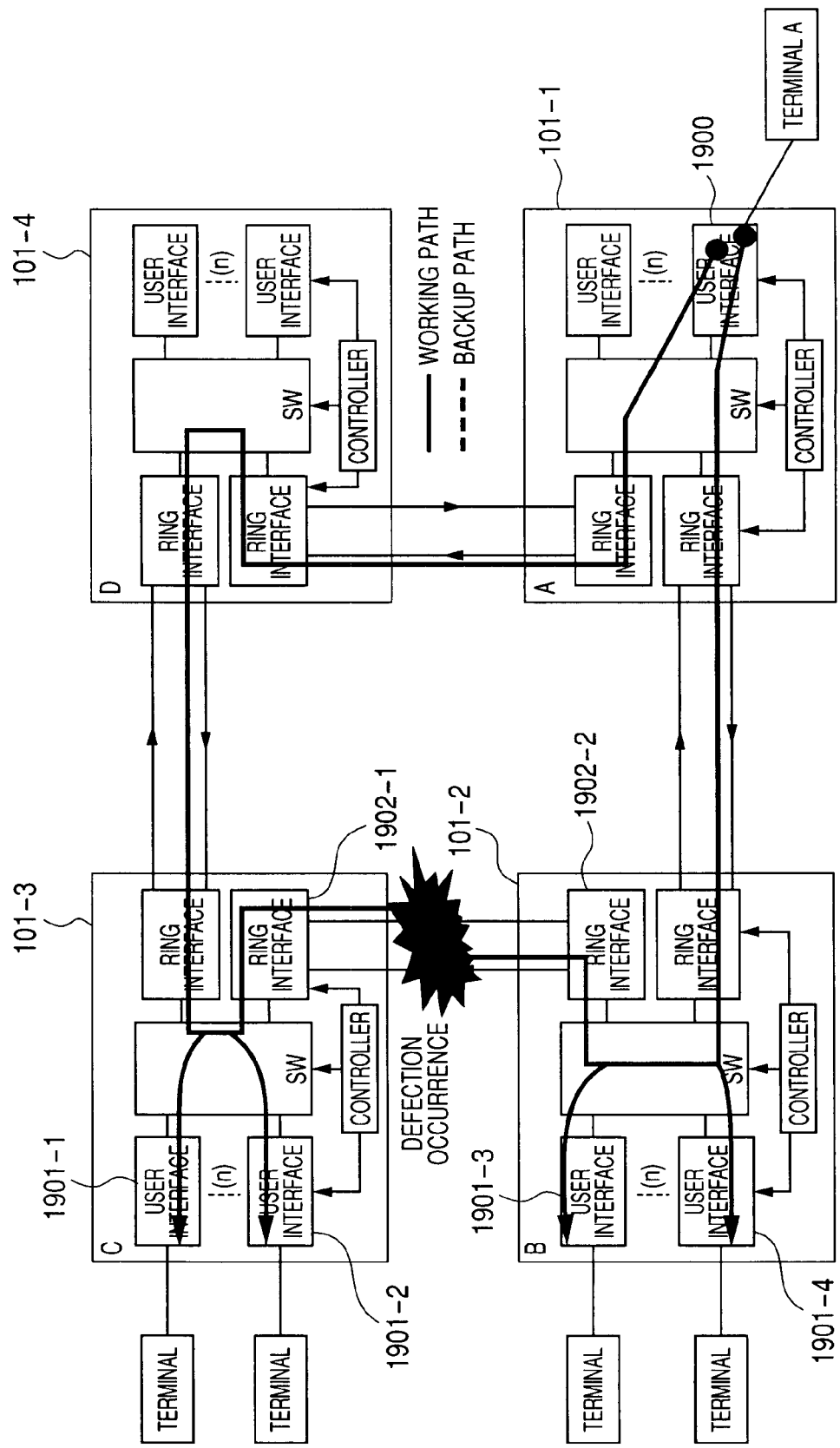
FIG. 19 a diagram showing a multicast frame transmitted to the user interfaces on the multipoint logical path by being copied in the user interface.

The user interface 1800 of the node A sets the MC copy flag of the logical path management table 320 to "1," rendering the backup path usable, so that the frame can be forwarded also to the backup path. By doing this, the data frame will be copied in the user interface 1800 and will be forwarded both to the working path and to the backup path, and accordingly the multicast frame can be forwarded to all the user interfaces, as shown in FIG. 19 (Step S804). The above is the path switching procedure when logical path defects occur both in the working path and in the backup path simultaneously. The use of this function makes it possible to copy the frame in the transmitting end node and forward it also to the backup path even when the logical path defects occur both in the working path and in the backup path simultaneously, whereby it becomes possible to continue forwarding the multicast frame.

The use of this embodiment enables a defect information transmission route leading to the transmitting end to be secured even when the communication is a multipoint communication that is an only one-way communication.

Moreover, since the healthcheck frame is forwarded via the multipoint logical path, each receiving end node can check the health of the path. Furthermore, the transmitting end node can check the health of the logical path in the ring by receiving the healthcheck frame transmitted by the local node itself. Moreover, if a defect occurs, by forwarding the forward defect indication frame via the multipoint logical path, information of the defect in a passing route and at the receiving end node can be sent for notification to the transmitting end node without a need of setting up a logical path for defect indication etc. Furthermore, since all the multipoint logical paths are constructed so as to go around the ring, it becomes unnecessary to manage the passing through nodes for each logical path.

In addition, since the logical path is switched according to a defect point and a frame is copied and forwarded to a multipoint transfer path, the multicast distribution can be continuously provided.

Moreover, although not illustrated, the same effect can be obtained by a method in which the switch 202 copies the frame and the ring interface 203 interchanges a MPLS label path between the working path and the backup path.

What is claimed is:

1. A network system comprising:
   first and second ring networks that make a pair each of which has a mutually opposite transmission direction and is constructed in the form of a ring;
   a ring interface that connects nodes constituting the ring network;
   a user interface that connects a user terminal or other node not constituting the ring network; and
   a node equipped with switching means for forwarding a frame inputted from the each interface to a desired destination according to its header information,
   wherein, for each multicast flow that forwards multicast data, a multipoint logical path serving as a working path is formed on the first ring network, and the multipoint logical path serving as a backup path is formed on the second ring network,
   wherein each of the multipoint logical paths serving as the working path and the backup path contains:
      a path that starts from the user interface of the multicast transmitting end node in the ring as a starting point and terminates at a user interface of a multicast receiving end node that is a node constituting the ring network and connects a user receiving the multicast data as a first terminating point, and
      a path that passes through a node constituting the ring network and terminates at the user interface of the multicast transmitting end node as a second terminating point,
   wherein, if defects occur both in the working path and in the backup path, the multicast data is copied by-the multicast transmitting end node, and the multicast data is forwarded both to the working path and to the backup path, and
   wherein, when the multicast transmitting end node detects a defect, if the defect occurs in the multipoint logical path serving as the working path, the multipoint logical path is switched from the multipoint logical path serving as the working path to the multipoint logical path serving as the backup path to forward a multicast frame, and if the defect occurs in the multipoint logical path serving as the backup path, the multicast frame continues to be forwarded via the working path.

2. The network system according to claim 1, wherein health of the multipoint logical paths serving as the working path and the backup path is checked as follows:
   a path healthcheck frame is inserted periodically from the user interface of the multicast transmitting end node and is terminated by the user interface of the multicast receiving end node,
   whereby the health of the path between the user interface of the multicast transmitting end node as the starting point and the user interface of the multicast receiving end node as the first terminating point is monitored.

3. The network system according to claim 2, wherein, by detecting that the user interface of the multicast transmitting end node serving as the second terminating point did not receive the path healthcheck frame within a fixed time period, occurrence of a defect in the multipoint logical path is detected.

4. The network system according to claim 1, wherein a node that detects a defect in a transmission path of the first or second ring network transmits a forward defect indication frame to the multipoint logical path formed on the ring network in which the defect occurs, and the forward defect indication frame is forwarded to the user interface of the multicast transmitting end node that is a second terminating point of the multipoint logical path, being transmitted through the nodes constituting the ring network sequentially.

5. The network system according to claim 4, wherein, at the time of defect detection, the multicast transmitting end node determines whether the forward defect indication frame is transmitted from the working path or from the backup path; if the forward defect indication frame is transmitted from the working path, the multicast transmitting end node switches the multipoint logical path from the working path to the backup path and transmits a multicast frame; if the forward defect indication frame is transmitted from the backup path, the working path continues to forward the multicast frame; and if the forward defect indication frames are transmitted both from the working path and from the backup path, the multicast transmitting end node copies the multicast frame and forwards them both to the working path and to the backup path.

6. The network system according to claim 1, wherein, when a defect occurs in the user interface of any of the multicast receiving end nodes, the multicast receiving end node transmits a backward defect indication frame to the multipoint logical path formed on the ring network in which the defect occurs, and the backward defect indication frame is transmitted to the user interface of the multicast transmitting end node that is a second terminating point of the multipoint logical path, being transmitted through the nodes constituting the ring network sequentially.

7. The network system according to claim 6, wherein, at the time of defect detection, when the multicast transmitting end node determines that a forward defect indication frame is transmitted from the user interface of the multicast receiving end node, the multipoint logical path is not switched.

8. A transmission apparatus for a network system comprising a plurality of other transmission apparatuses, the transmission apparatus comprising:
- a ring interface that provides for communication with ring interfaces of the plurality of other transmission apparatuses by using a working path and a backup path, the first working path having a transmission direction that is opposite to a transmission direction of the backup path;
- a switching unit that forwards frames inputted from each interface to a desired output according to header information of the frames;
- a user interface that includes a header processing unit that processes the header information of the frames, a receiving unit that receives the frames from the switching unit and a terminal, and a transmitting unit which forwards frames to the switching unit and the terminal; and
- an OAM (Operation, Administration, and Maintenance) processing unit that periodically generates a path healthcheck frame, transmits the path healthcheck frame to the other transmission apparatus using the working path and the backup path via the ring interface, and, upon detecting defects in the working path and backup path, sets multicast frames inputted from each interface to be forwarded to both the working path and backup path;
- wherein the OAM processing unit sets multicast frames inputted from each interface to be forwarded to both the working path and backup path by transmitting a path switching request frame to the backup path, setting a multicast copy flag of the working path that indicates all frames addressed to the working path are to be copied and transmitted, and setting a blockade flag of the backup path that indicates that the backup path is the working path.

9. A transmission apparatus for a network system comprising a plurality of other transmission apparatuses, the transmission apparatus comprising:
- a ring interface that provides for communication with ring interfaces of the plurality of other transmission apparatuses by using a working path and a backup path, the first working path having a transmission direction that is opposite to a transmission direction of the backup path;
- a switching unit that forwards frames inputted from each interface to a desired output according to header information of the frames;
- a user interface that includes a header processing unit that processes the header information of the frames, a receiving unit that receives the frames from the switching unit and a terminal, and a transmitting unit which forwards frames to the switching unit and the terminal; and
- an OAM (Operation, Administration, and Maintenance) processing unit that periodically generates a path healthcheck frame, transmits the path healthcheck frame to the other transmission apparatus using the working path and the backup path via the ring interface, and, upon detecting defects in the working path and backup path, sets multicast frames inputted from each interface to be forwarded to both the working path and backup path;
- wherein the OAM processing unit, upon receiving a path switching request from one of the other transmission apparatuses, acquires a logical path management table entry, determines whether the user interface is set as a multicast frame transmitting end based on the logical path management table entry, and, if the user interface is not set as a multicast frame transmitting end, cancels a blockade flag of the logical path management table entry for the backup path to enable the user interface to receive frames from a new working path and sets a blockade flag of the logical path management table entry for the working path to effect blockade of the working path.

10. A transmission apparatus for a network system comprising a plurality of other transmission apparatuses, the transmission apparatus comprising:
- a ring interface that provides for communication with ring interfaces of the plurality of other transmission apparatuses by using a working path and a backup path, the first working path having a transmission direction that is opposite to a transmission direction of the backup path;
- a switching unit that forwards frames inputted from each interface to a desired output according to header information of the frames;
- a user interface that includes a header processing unit that processes the header information of the frames, a receiving unit that receives the frames from the switching unit and a terminal, and a transmitting unit which forwards frames to the switching unit and the terminal; and
- an OAM (Operation, Administration, and Maintenance) processing unit that periodically generates a path healthcheck frame, transmits the path healthcheck frame to the other transmission apparatus using the working path and the backup path via the ring interface, and, upon detecting defects in the working path and backup path, sets multicast frames inputted from each interface to be forwarded to both the working path and backup path;

wherein the ring interface includes a label search table having a first user interface transmission flag, a second user interface transmission flag, a first ring interface transmission flag, and a second user interface transmission flag for indicating a transmission destination interface of a received frame; and wherein the ring interface relays and terminates the received frame if the first user interface transmission flag is set and the first user interface transmission flag is set, terminates the received frame if the second user interface transmission flag is set, and relays the received frame if the second ring interface transmission flag is set.

* * * * *